(12) United States Patent
O'Neil et al.

(10) Patent No.: US 8,715,093 B2
(45) Date of Patent: May 6, 2014

(54) SPACER FOR A DRIVESHAFT ASSEMBLY

(75) Inventors: Thomas M. O'Neil, Holland, OH (US); Jeffrey Allan Dutkiewicz, Ottawa Hills, OH (US); Johnny Neal Smith, Toledo, OH (US)

(73) Assignee: Dana Automative Systems Group, LLC, Maumee, OH (US)

( * ) Notice: Subject to any disclaimer, the term of this patent is extended or adjusted under 35 U.S.C. 154(b) by 13 days.

(21) Appl. No.: 13/231,506

(22) Filed: Sep. 13, 2011

(65) Prior Publication Data

US 2012/0071250 A1 Mar. 22, 2012

Related U.S. Application Data

(60) Provisional application No. 61/403,600, filed on Sep. 17, 2010.

(51) Int. Cl.
*F16D 1/104* (2006.01)

(52) U.S. Cl.
USPC ............................................. 464/182; 464/89

(58) Field of Classification Search
USPC ............. 464/89, 182; 403/365, 367; 277/627, 277/650
See application file for complete search history.

(56) References Cited

U.S. PATENT DOCUMENTS

| | | |
|---|---|---|
| 1,906,057 A | 4/1933 | Guy |
| 3,584,473 A * | 6/1971 | MacDonald et al. ..... 464/182 X |
| 4,357,137 A | 11/1982 | Brown |
| 4,530,674 A | 7/1985 | Rauch |
| 5,415,527 A | 5/1995 | Godwin |
| 5,902,186 A * | 5/1999 | Gaukel ........................ 464/89 X |
| 6,599,052 B1 | 7/2003 | Phillips |
| 7,442,127 B2 * | 10/2008 | Kai et al. .................. 464/182 X |
| 2005/0239558 A1 | 10/2005 | Brandt et al. |
| 2007/0181400 A1* | 8/2007 | Evans |
| 2008/0286039 A1 | 11/2008 | Martin et al. |

FOREIGN PATENT DOCUMENTS

| | | |
|---|---|---|
| EP | 0 588 468 A2 | 3/1994 |
| EP | 0 990 809 A1 | 4/2000 |
| GB | 1344445 | 1/1974 |
| WO | WO 02/053940 A2 | 7/2002 |

* cited by examiner

*Primary Examiner* — Gregory Binda
(74) *Attorney, Agent, or Firm* — Marshall & Melhorn, LLC

(57) ABSTRACT

A driveshaft assembly having a tubular shaft, an end component, and an annular anti-fretting spacer is disclosed. The tubular shaft has a first receiving end portion with an opening and an inner diameter, a center portion with an inner diameter, and an interior with an inner surface. The driveshaft end component has an insert end portion and an attachment end portion. The spacer has a first outer diameter that is substantially equal to the receiving end portion inner diameter, a second outer diameter, and an outer surface. At least a portion of the outer surface contacts the shaft inner surface and the spacer is disposed on the insert end portion of the driveshaft end component and the insert end portion, including the spacer, is disposed within the receiving end portion with an interference fit, and the shaft is rigidly coupled to the driveshaft end component.

25 Claims, 10 Drawing Sheets

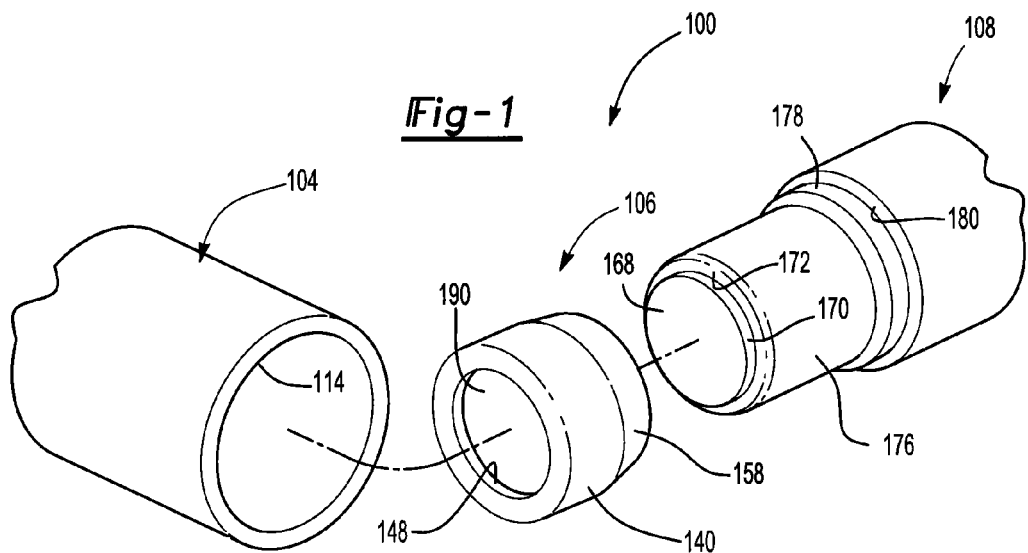
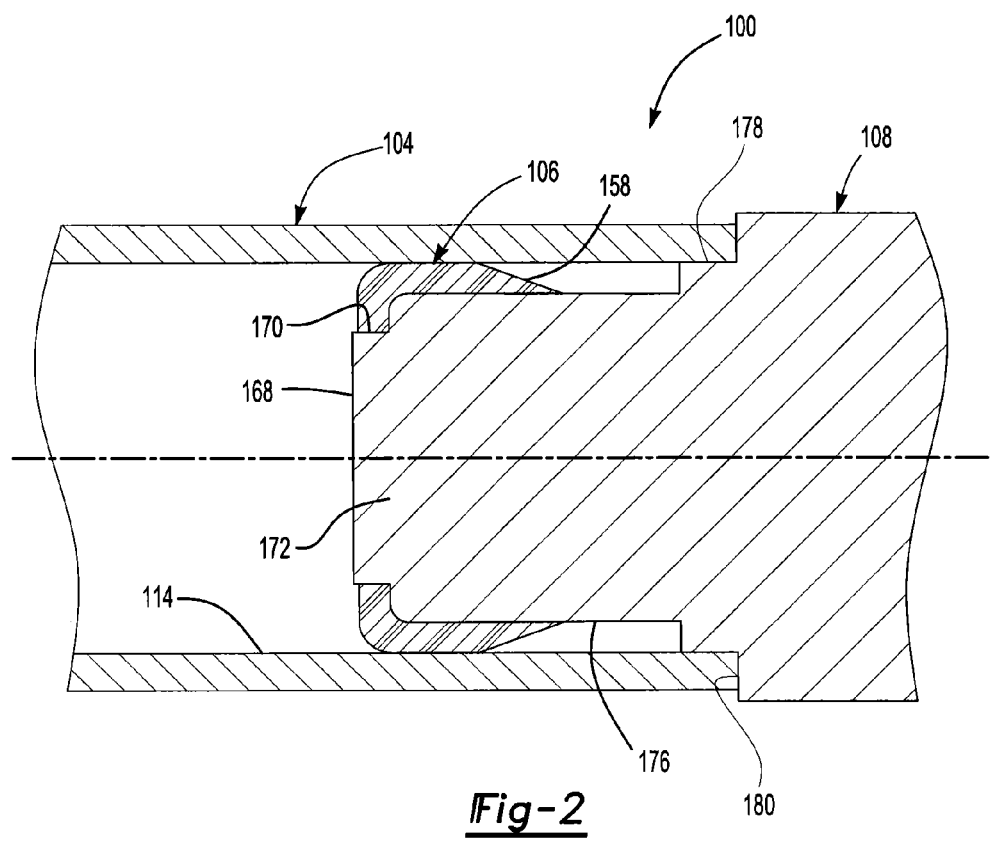

SPACER FOR A DRIVESHAFT ASSEMBLY

RELATED APPLICATIONS

This application is claiming the benefit, under 35 U.S.C. §119(e), of the provisional application filed on Sep. 17, 2010, under 35 U.S.C. §111(b), which was granted Ser. No. 61/403,600, and is hereby incorporated by reference in its entirety.

FIELD OF THE INVENTION

The present invention relates to a spacer disposed between mechanically associated components. More particularly, the present invention relates to a spacer disposed between rigidly coupled mechanically associated components, such as those in a driveshaft assembly.

BACKGROUND OF THE INVENTION

To reduce fastener use or to militate against positional deviations, an interference fit is desirable for many components of machine assemblies. Typically, the interference fit is formed by joining a slightly oversized male component with a female component or by joining a slightly undersized female component with a male component. Particularly, the interference fit is desirable when joining components of driveshaft assemblies.

However, depending on the ultimate use of the assembled components, an interference fit can produce undesirable secondary effects. For example, the interference fit may cause component fretting. Fretting results from repeated vibrational or cyclical stressing of two mechanically associated components. With respect to driveshaft assemblies in particular, fretting may occur due to torsional stresses exerted between a shaft and a driveshaft end component such that slight movements between the shaft and the driveshaft end component result in fretting. Thus, the more contact between the two components involved in the interference fit, the more accurate the alignment between the two components must be if fretting is to be prevented.

Further, the undesirable debris produced by the repeated vibrational or cyclical stressing of an interference fit may result in unwanted noise during operation. Undesired noise may also be produced by torsional stresses exerted between metal components having the interference fit.

Also, use of an interference fit between components of driveshaft assemblies can increase production time as a result of the need to press the components together during manufacturing. Lastly, as the interference fit is typically between two metallic components, the components must be sized very accurately, further increasing a manufacturing cost of the driveshaft assembly.

The prior art generally discloses the concept of disposing a spacer between mechanically associated components to try to overcome some of the aforementioned issues. However, the spacers disclosed in the prior art are designed to perform different functions, than the spacer of the present invention. For example, U.S. Pat. No. 4,530,674 discloses a coupling shaft that includes a non-metallic bushing disposed between male and female members. The coupling shafts in this patent are slidably connected and the male members include crowned surfaces. However, in contrast to the embodiments of the present invention, the male and female members of the '674 patent are not rigidly coupled to one another. Thus, where a bushing is employed in the coupling shaft, the bushing is a load bearing bushing thus performing a different function than the spacers of the present invention.

Similarly, U.S. Pat. No. 4,357,137 discloses a shaft coupling that includes male and female members and a plastic insert, where the male member is not rigidly coupled to the female member and the plastic insert transmits the load from one member to the other.

As another example, European Patent Application Publication No. EP 0 588 468 A2 discloses a component for coupling a keyed shaft to a keyed sleeve. However, unlike the embodiments of the present invention, the keyed shaft is not rigidly coupled to the keyed sleeve. The component, which is preferably formed from a plastic, bears the transmitted load and also permits some misalignment of the keyed shaft and the keyed sleeve. The component may incidentally militate against fretting that may occur when the keyed shaft and the keyed sleeve are formed from a metal.

European Patent Application Publication No. EP 0 990 809 A1 discloses a system for coupling rotary shafts that includes a keyed shaft, a sleeve insert, and a keyed sleeve. The keyed shaft and the sleeve insert are slidingly disposed in the keyed sleeve and the sleeve insert is load bearing.

In addition, the spacers disclosed in the prior art are structurally different than the spacers of the present invention. For example, U.S. Patent Application Publication No. 2008/0286039 discloses a yoke bushing for reducing cyclic movement between a main shaft and a yoke. The yoke is rigidly coupled to the main shaft and the yoke bushing is disposed therebetween. The yoke bushing is a flexible structure that equalizes stress fields between the main shaft and the yoke. All embodiments of the '039 Application place particular emphasis on the upper and lower portions of the yoke bushing, and the middle portion either does not contact the main shaft or contains an elastomeric insert, unlike the present invention which relies on intimate contact between the central portion of the spacer and the shaft to form the interference fit.

As another example, the shaft and sleeve embodied in European Patent Application Publication No. EP 0 990 809 A1 may be splined and the sleeve insert may be a split insert. Whereas, the annular spacer embodied in the present invention have a hollow, generally tubular shaped body.

As seen by the above discussion, the spacers of the prior art are usually between components that are not rigidly coupled. Such spacers can be load bearing, functional components of the mechanical assemblies at issue.

Thus, it would be advantageous to develop a spacer for a driveshaft assembly that is easy to manufacture and/or install and will militate against fretting wear between rigidly coupled mechanically associated components, facilitate assembly, and militate against undesired operational noise of the driveshaft assembly.

SUMMARY OF THE INVENTION

The present invention is directed toward an annular spacer that maintains an interference fit between a driveshaft end component and a tubular driveshaft. The annular spacer of the present invention is easy to manufacture and/or install, militates against fretting wear between rigidly coupled mechanically associated components, facilitates assembly, and militates against undesired operational noise of the driveshaft assembly. The annular spacer of the present invention eliminates a metal to metal interference fit between the driveshaft end component and the tubular driveshaft. As a result of eliminating the metal to metal interference fit, fretting wear between the driveshaft end component and the tubular driveshaft is eliminated.

In accordance with the present invention, a driveshaft assembly is comprised of: a tubular shaft comprising at least a first receiving end portion with an opening disposed therein, wherein the receiving end portion has a receiving end portion inner diameter, a center portion, wherein the center portion has a center portion inner diameter, and a hollow interior with a shaft inner surface; a driveshaft end component comprising an insert end portion and an attachment end portion; and an annular anti-fretting spacer comprising a first outer diameter, wherein the first outer diameter of the spacer is substantially equal to the receiving end portion inner diameter, a second outer diameter, and an outer surface, wherein at least a portion of the outer surface is in contact with the shaft inner surface, wherein the spacer is disposed on the insert end portion of the driveshaft end component, wherein the insert end portion of the driveshaft end component, including the spacer, is disposed within the receiving end portion of the shaft with an interference fit, and wherein the shaft is rigidly coupled to the driveshaft end component. In some embodiments the annular anti-fretting spacer may be composed of a UV-cured urethane. In some embodiments, the spacer is disposed in the receiving end portion of the shaft with an interference fit, wherein the insert end portion of the driveshaft end component is disposed within the spacer with an interference fit.

These and other features and advantages of the present invention will be better understood and its advantages will be more readily appreciated from the detailed description of the preferred embodiment, especially when read with reference to the accompanying drawings.

BRIEF DESCRIPTION OF THE DRAWINGS

The above, as well as other, advantages of the present invention will become readily apparent to those skilled in the art from the following detailed description when considered in the light of the accompanying drawings in which:

FIG. 1 is a partial, perspective view of an embodiment of an exploded driveshaft assembly including a spacer according to a first embodiment of the present invention;

FIG. 2 is a partial, cross-sectional view of an embodiment of an assembled driveshaft assembly including a spacer according to the first embodiment of the present invention;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless expressly stated otherwise.

Figure 3:
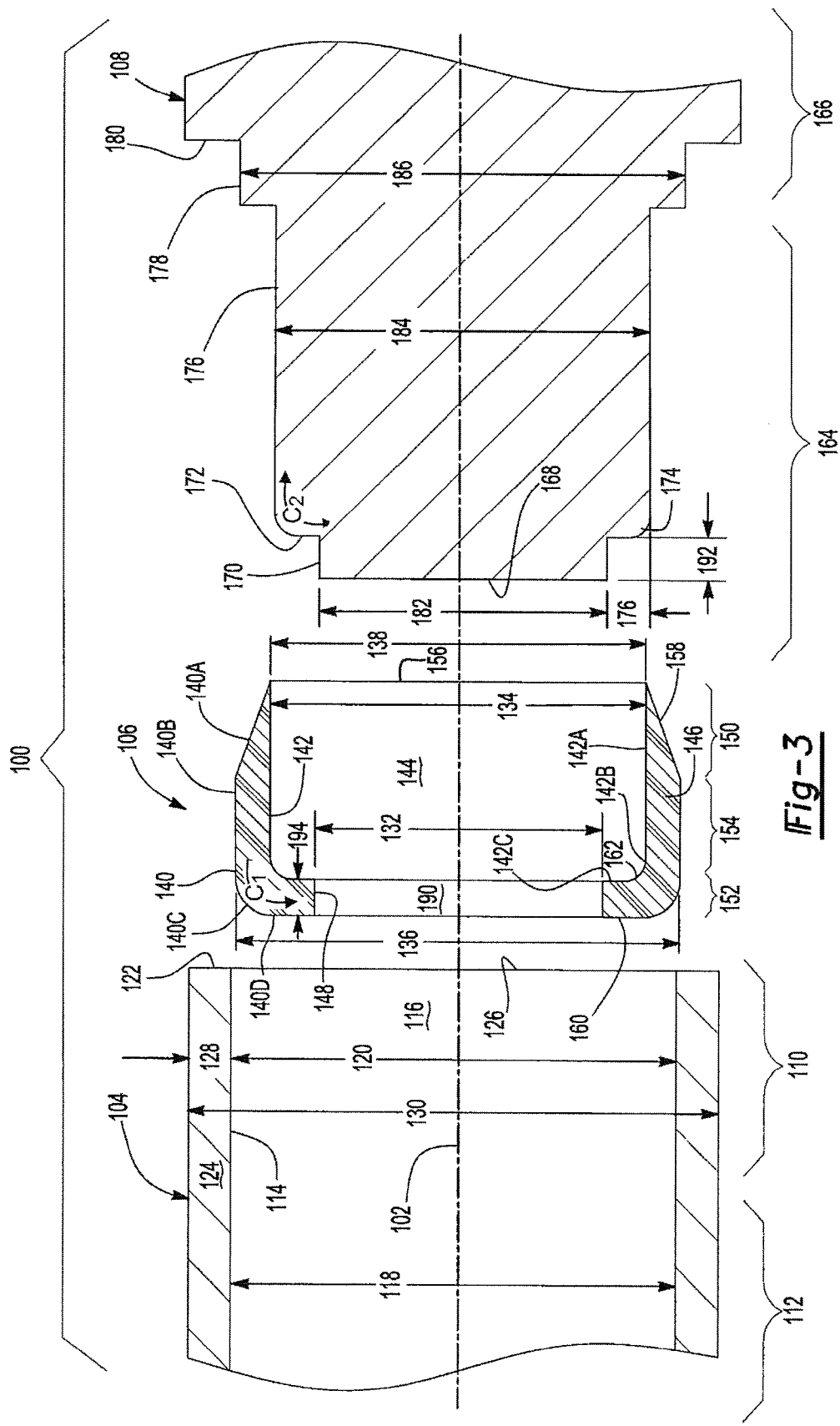
FIG. 3 is a partial, cross-sectional view of an embodiment of an exploded driveshaft assembly including a spacer according to the first embodiment of the present invention.

FIGS. 1 through 3 illustrate different views of a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 100 is assembled along a longitudinal axis 102. The driveshaft assembly 100 includes a shaft 104, an annular spacer 106, and a driveshaft end component 108. As shown, the spacer 106 is disposed between a first receiving end portion 110 of the shaft 104 and a first driveshaft end component 108, but it is understood the spacer 106 may be disposed between a second receiving end portion (not shown) of the shaft 104 and a second driveshaft end component (not shown).

The shaft 104 is a tubular, elongate body comprising the first receiving end portion 110, the second receiving end portion (not shown), and a center shaft portion 112 (shown in part), wherein the center shaft portion 112 is bounded by the first 110 and second (not shown) receiving end portions. As shown in FIG. 3, the shaft 104 may be hollow, with a shaft inner surface 114 and a hollow interior 116 extending along and through the shaft 104. The center shaft portion 112 of shaft 104 may have a center shaft portion inner diameter 118 that is substantially the same as a receiving end portion inner diameter 120 of either or both of the first 110 or second (not shown) receiving end portions. Alternatively, the center portion 112 of shaft 104 may have a center shaft portion inner diameter 118 that differs from a receiving end portion inner diameter 120 of either or both of the first 110 or second (not shown) receiving end portions.

The first receiving end portion 110 comprises at least (i) a terminus 122 of wall 124 of the shaft 104 and (ii) an opening 126 to hollow interior 116, wherein the terminus 122 has a thickness 128 defined by the difference between the receiving end portion inner diameter 120 and a receiving end portion outer diameter 130.

The shaft 104 may be formed by extrusion, but other processes such as roll forming, tube milling, or machining may be used. The shaft 104 may be formed from aluminum, a steel, or any other metal. The shaft 104 may also be a composite shaft. A composite shaft is comprised of, for example, a non-metallic center portion, a metallic first distal end portion, and a metallic second distal end portion. The non-metallic center portion may be formed from carbon fiber.

The annular spacer 106 is a hollow, generally ring shaped body, with a first inner diameter 132, a second inner diameter 134, and at least a first outer diameter 136 and second outer diameter 138, wherein the second outer diameter 138 may be substantially the same as the second inner diameter 134. The spacer 106 also comprises an outer surface 140, an inner surface 142, an interior 144, a wall 146 interposed between the outer 140 and inner 142 surfaces and a terminal surface 148. The spacer 106 also comprises a first end portion 150, a second end portion 152, and a center portion 154, wherein the center portion 154 is bounded by the first 150 and second 152 end portions.

A first opening 156 is disposed within the first end portion 150. The first end portion 150 may further comprise a tapered portion 158. The second end portion 152 comprises a lip portion 160 and a transition portion 162. The second end portion 152 is formed with the wall 146 of the spacer 106 bent in an arcuate fashion toward the interior 144 of the spacer 106. This arcuate bend in the wall 146 forms the transition portion 162 and has a radius of curvature $C_1$. The portion of the wall 146 that points to the interior 144 of the spacer 106 forms the lip portion 160. The lip portion 160 is unitary with the spacer 106 and may be substantially at a right angle to the center portion 154 of the spacer 106.

The wall 146 of the spacer 106 may increase in thickness along the longitudinal axis 102 in the direction from the first opening 156 of the spacer 106 towards the center portion 154 of the spacer 106, thus forming the tapered portion 158. The wall 146 of the spacer, disregarding the tapered portion 158, may have a minimum thickness of 0.0003 inches.

For the purposes of the instant description, the outer surface 140 may be further categorized as 140A, 140B, 140C, or 140D, depending on where along the spacer 106 the outer surface 140 is geographically. To elaborate: 140A designates the outer surface 140 at the tapered portion 158; 140B designates the outer surface 140 at the center portion 154; 140C designates the outer surface 140 at the transition portion 162; and 140D designates the outer surface 140 at the lip portion 160. A reference to the outer surface 140 without the use of a letter is meant to indicate the outer surface 140 in total, or any portion thereof, without regard to geographic location along the spacer 106.

Likewise, for the purposes of the instant description, the inner surface 142 may be further categorized as 142A, 142B, or 142C, depending on where along the spacer 106 the inner surface 142 is geographically. To elaborate: 142A designates the inner surface 142 at the tapered 158 and center 154 portions; 142B designates the inner surface 142 at the transition portion 162; and 142C designates the inner surface 142 at the lip portion 160. A reference to the inner surface 142 without the use of a letter is meant to indicate the inner surface 142 in total or any portion thereof, without regard to geographic location along the spacer 106.

Figures 11A, 11B:
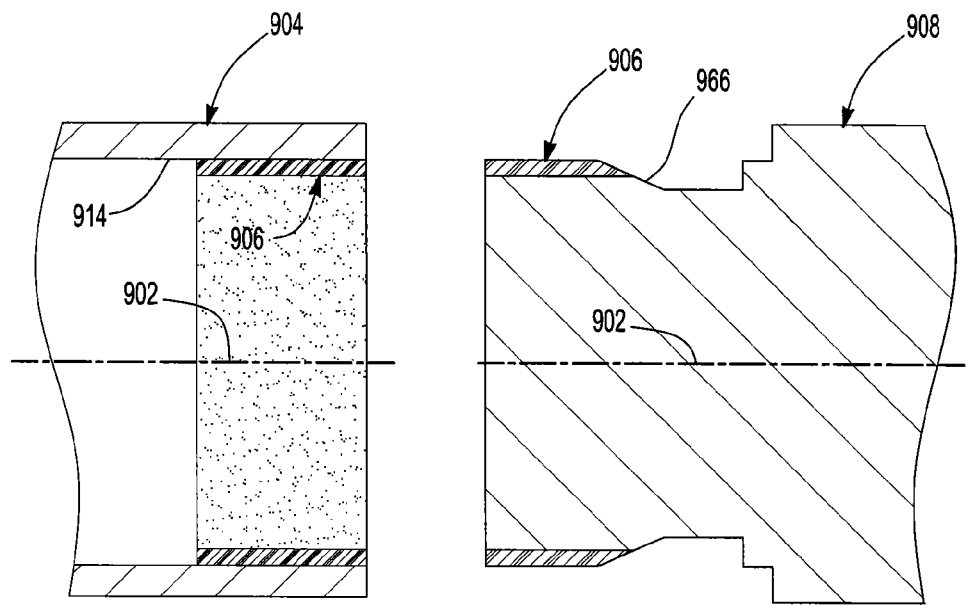
FIG. 11A is a partial, cross-sectional view of an embodiment of a tubular driveshaft according to yet another embodiment of the present invention.
FIG. 11B is a partial, cross-sectional view of an embodiment of an assembled spacer and driveshaft end component according to yet another embodiment of the present invention.

The spacer 106 may be formed from a polymeric material, or from any other material, such as plastic, metal, paper, cardboard, wood, paint, or fabric. The spacer 106 may be formed by injection molding. The spacer 106 may be formed from any other process, such as heat shrinking, where, the spacer is loosely disposed on at least a portion of the driveshaft end component 108 and heated, causing the polymeric heat-shrink material to contract around at least a portion of the driveshaft end component 108. Alternatively, the spacer may comprise a pliable substrate wrapped around at least a portion of the driveshaft end component 108. Further, the spacer may comprise a coating applied to at least a portion of the driveshaft end component 108, or as shown in FIG. 11A, the coating may be applied to the inner surface 114 of the receiving end portion 110. The spacer may comprise a UV-cured urethane coating on at least a portion of the driveshaft end component 108 or the inner surface 114 of the receiving end portion 110. Generally, the UV-cured urethane coating would be sprayed onto the desired component of the driveshaft assembly 100 and subsequently cured with UV light.

The driveshaft end component 108 is a rigid body comprising an insert end portion 164 in axial alignment with an attachment end portion 166 (shown in part). The driveshaft end component 108 may be formed by machining a blank, forging, or casting. The driveshaft end component 108 may be formed from a metal such as aluminum or steel. As shown, the driveshaft end component 108 is a unitary body, but it may be formed from a plurality of coupled components.

The insert end portion 164 comprises an end surface 168, a spacer mounting seat 170, a spacer catch surface 172, a spacer edge 174, a main insert portion 176, a shaft mounting seat 178, and a shaft catch surface 180, all in axial alignment with one another.

The spacer mounting seat 170 is an annular protrusion from the main insert portion 176. As shown, the spacer mounting seat 170 has a diameter 182 that is constant; however, the spacer mounting seat 170 may be tapered. Further, the spacer mounting seat 170 may include features or be sized to facilitate disposal of the spacer 106 on the driveshaft end component 108.

The spacer catch surface 172 is an annular, generally planar surface that defines the boundary between the spacer mounting seat 170 and the main insert portion 176. The spacer catch surface 172 preferably lies in a plane substantially transverse to the longitudinal axis 102 of the assembled driveshaft 100. However, the spacer catch surface 172 may also extend between the spacer mounting seat 170 and the main insert portion 176 in ways other than transverse, such as angled or curvilinear.

The main insert portion 176 is an annular protrusion from the shaft mounting seat 178. As shown, the main insert portion 176 is substantially cylindrical and has a diameter 184 that is constant; however, as suggested in FIGS. 11B and 12, the main insert portion 176 may be tapered. Further, the main insert portion 176 may include features or be sized to facilitate welding the shaft 104 to the driveshaft end component 108.

The spacer edge 174 is formed at the boundary between the spacer catch surface 172 and the main insert portion 176. The spacer edge 174 has a radius of curvature $C_2$.

The shaft mounting seat 178 is an annular protrusion from the attachment end portion 166 of the driveshaft end component 108. As shown, the shaft mounting seat 178 has a diameter 186 that is constant; however, the shaft mounting seat 178 may be tapered. Further, the shaft mounting seat 178 may include features or be sized to facilitate welding the shaft 104 to the driveshaft end component 108.

The shaft catch surface 180 is an annular, planar surface that defines the boundary between the insert end portion 164 and the attachment end portion 166. The shaft catch surface 180 preferably lies in a plane substantially transverse to the longitudinal axis 102 of the assembled driveshaft 100. However, the shaft catch surface 180 may also extend between the shaft mounting seat 178 and the attachment end portion 166 in ways other than transverse, such as angled or curvilinear.

The attachment end portion 166 includes a coupling end (not shown). The coupling end may comprise a yoke for coupling the driveshaft end component 108 to a universal joint, a constant velocity joint, or any other joint. Alternatively, the coupling end may include a plurality of splines formed thereon, gear teeth formed thereon, or the coupling end may include any other fitting.

The first outer diameter 136 of the spacer 106 is substantially the same as the receiving end portion inner diameter 120 of the shaft 104, thereby providing for an interference fit between the spacer 106 and the shaft 104 upon assembly of the driveshaft 100. Further, the receiving end portion inner diameter 120 of the shaft 104 is substantially the same as the diameter 186 of the shaft mounting seat 178 of the driveshaft end component 108, thereby by providing for an interference fit between the driveshaft end component 108 and the shaft 104 upon assembly of the driveshaft 100.

The first inner diameter 132 of the spacer 106, equal to a diameter of a second opening 190 to the interior 144 encircled by the terminal surface 148, is substantially the same as the diameter 182 of the spacer mounting seat 170, thereby providing for an interference fit between the spacer 106 and the spacer mounting seat 170.

The second inner diameter 134 of the spacer 106 is substantially the same as the diameter 184 of at least a portion of the main insert portion 176, thereby providing for an interference fit between the spacer 106 and at least a portion of the main insert portion 176.

The thickness 192 of the spacer mounting seat 170, measured as the distance along the longitudinal axis 102 between the end surface 168 and the spacer catch surface 172, may be substantially the same as a length 194 of the terminal surface 148, as measured along the longitudinal axis 102. However, the thickness 192 of the spacer mounting seat 170 may be such that the end surface 168 may be recessed from, or protrude from, the second opening 190 of spacer 106.

The spacer catch surface 172 may have a radial dimension equal to the difference between the diameter 184 of the main insert portion 176 and the diameter 182 of the spacer mounting seat 170.

The transition portion 162 has a radius of curvature, $C_1$, that is substantially the same as the radius of curvature, $C_2$, of the spacer edge 174 formed between the spacer catch surface 172 and the main insert portion 176. That is, $C_1 \cong C_2$, thus allowing for substantially continuous contact between the inner surface 142 of the spacer 106 and at least a portion of the insert end portion 164 upon assembly of the driveshaft 100.

Upon assembly, the spacer 106 is disposed on at least a portion of the insert end portion 164 such that the end surface 168 and spacer mounting seat 170 are disposed within the second opening 190. The inner surface 142C contacts the spacer catch surface 172 and the inner surface 142A contacts the main insert portion 176. Inner surface 142B contacts spacer edge 174.

The terminal surface 148 contacts the spacer mounting seat 170, but end surface 168 would be visible through the second opening 190 and is not in contact with the spacer 106. The end surface 168 may be flush with the outer surface 140 of the spacer 106 or the end surface 168 may be recessed therefrom or protrude therefrom. If present, the tapered portion 158 may form a smooth, stepless transition from the outer surface 140 of the spacer 106 to the main insert portion 174.

Further, the shaft 104 sits on the insert end portion 164 such that the shaft mounting seat 178 is disposed within the hollow interior 116 of the shaft 104, forming an interference fit between the shaft mounting seat 178 and the shaft inner surface 114. The terminus 122 of the wall 128 of the shaft 104 contacts the shaft catch surface 180. At least a portion of the outer surface 140 of the spacer 106 contacts the inner surface 114 of the shaft 104, forming an interference fit between the spacer 106 and the inner surface 114 of the shaft 104. Preferably, the portion of the outer surface 140 of the spacer 106 that contacts the shaft inner surface 114 of the shaft 104 is the outer surface 140B at the center portion 154 of the spacer 106.

When the driveshaft assembly 100 is completed, the first receiving end portion 110 is coupled to the driveshaft end component 108 at the first receiving end portion 110 by a weld. The first receiving end portion 110 may be coupled to the driveshaft end component 108 by a magnetic pulse weld, a butt weld formed therebetween, an arc seam weld formed through the shaft 104, or by any other method of welding. Alternately, a plurality of fasteners (not shown) may be used to couple the first receiving end portion 110 to the driveshaft end component 108. When the plurality of fasteners is used to couple the first receiving end portion 110 to the driveshaft end component 108, the first receiving end portion 110 may include a mounting flange (not shown) for receiving the plurality of fasteners.

Figure 4:
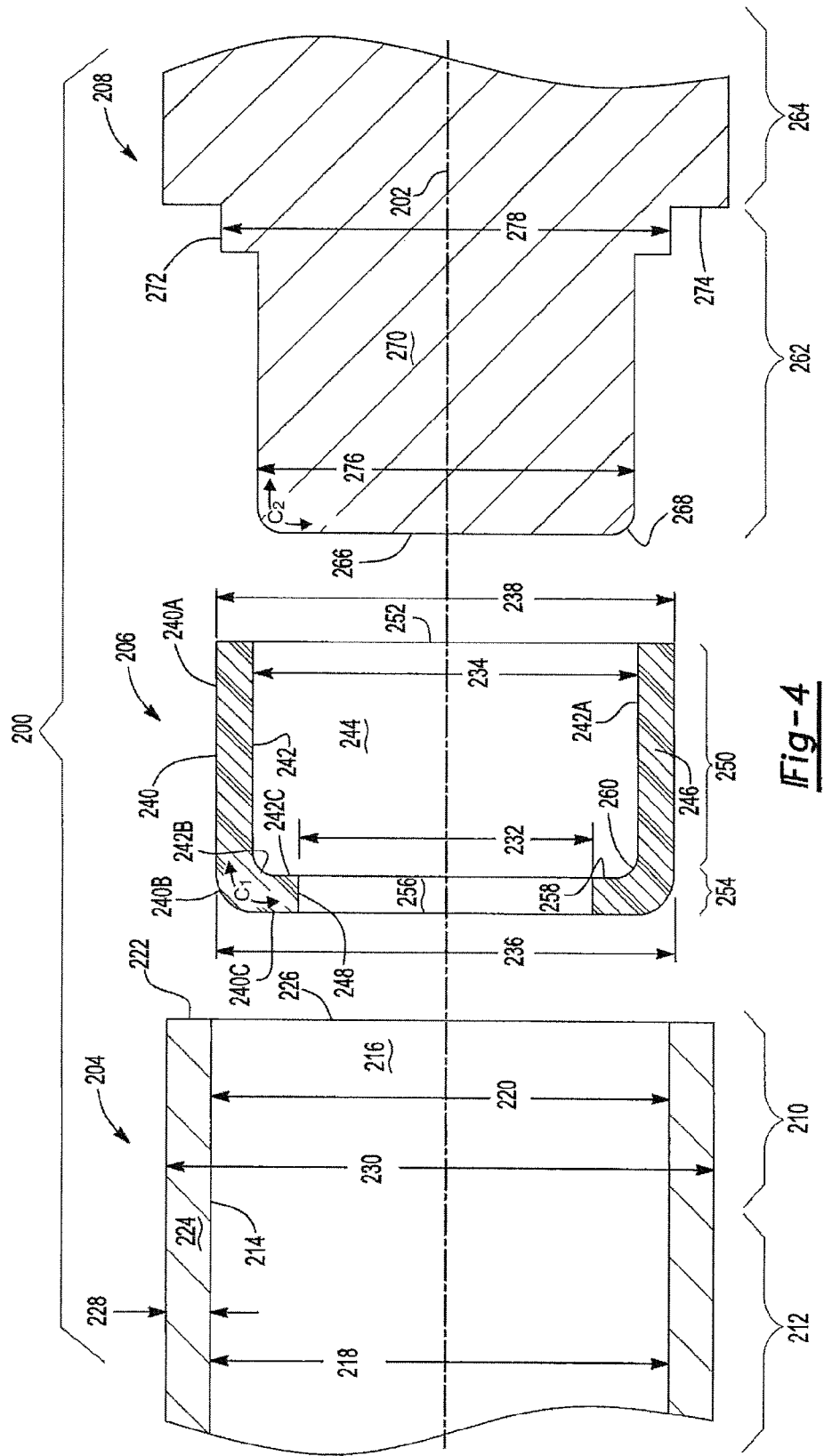
FIG. 4 is a partial, cross-sectional view of an embodiment of an exploded driveshaft assembly including a spacer according to another embodiment of the present invention.

FIG. 4 illustrates a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 200 is assembled along a longitudinal axis 202. The driveshaft assembly 200 includes a shaft 204, an annular spacer 206, and a driveshaft end component 208. As shown, the spacer 206 is disposed between a first receiving end portion 210 of the shaft 204 and a first driveshaft end component 208, but it is understood the spacer 206 may be disposed between a second receiving end portion (not shown) of the shaft 204 and a second driveshaft end component (not shown).

The shaft 204 is a tubular, elongate body comprising the first receiving end portion 210, the second receiving end portion (not shown), and a center shaft portion 212 (shown in part), wherein the center shaft portion 212 is bounded by the first 210 and second (not shown) receiving end portions. As shown in FIG. 4, the shaft 204 may be hollow, with an inner surface 214 and a hollow interior 216 extending along and through the shaft 204. The center shaft portion 212 of shaft 204 may have a center shaft portion inner diameter 218 that is substantially the same as a receiving end portion inner diameter 220 of either or both of the first 210 or second (not shown) receiving end portions. Alternatively, the center portion 212 of shaft 204 may have a center shaft portion inner diameter 218 that differs from a receiving end portion inner diameter 220 of either or both of the first 210 or second (not shown) receiving end portions.

The first receiving end portion 210 comprises at least (i) a terminus 222 of wall 224 of the shaft 204 and (ii) an opening 226 to hollow interior 216, wherein the terminus 222 has a thickness 228 defined by the difference between the receiving end portion inner diameter 220 and the receiving end portion outer diameter 230.

The shaft 204 may be formed by extrusion, but other processes such as roll forming, tube milling, or machining may be used. The shaft 204 may be formed from aluminum, a steel, or any other metal. The shaft 204 may also be a composite shaft. A composite shaft is comprised of, for example, a non-metallic center portion, a metallic first distal end portion, and a metallic second distal end portion. The non-metallic center portion may be formed from carbon fiber.

The annular spacer 206 is a hollow, generally tubular shaped body, with a first inner diameter 232, a second inner diameter 234, and at least a first outer diameter 236 and second outer diameter 238. Although not shown in this figure, the second outer diameter 238 may be substantially the same as the second inner diameter 234. The spacer 206 also comprises an outer surface 240, an inner surface 242, an interior 244, a wall 246 interposed between the outer 240 and inner 242 surfaces, and a terminal surface 248. The spacer 206 also comprises a main portion 250, with a first opening 252 to the interior 244 disposed therein, and an end portion 254, with a second opening 256 to the interior 244 disposed therein.

The main portion 250 may further comprise a tapered portion (not shown). The end portion 254 comprises a lip portion 258 and a transition portion 260. The end portion 254 is formed with the wall 246 of the spacer 206 bent in an arcuate fashion toward the interior 244 of the spacer 206. This arcuate bend in the wall 246 forms the transition portion 260 and has a radius of curvature $C_1$. The portion of the wall 246 that points to the interior 244 of the spacer 206 forms the lip portion 258. The lip portion 258 is unitary with the spacer 206 and may be substantially at a right angle to the main portion 250 of the spacer 206. The wall 246 of the spacer 206 may increase in thickness along the longitudinal axis 202 in the direction from the first opening 252 of the spacer 206 towards the end portion 254 of the spacer 206, thus forming a tapered portion (not shown). The wall 246 of the spacer, disregarding any taper, may have a minimum thickness of 0.0003 inches.

For the purposes of the instant description, the outer surface 240 may be further categorized as 240A, 240B, or 240C, depending on where along the spacer 206 the outer surface 240 is geographically. To elaborate: 240A designates the outer surface 240 at the main portion 250; 240B designates the outer surface 240 at the transition portion 260; and 240C designates the outer surface 240 at the lip portion 258. A reference to the outer surface 240 without the use of a letter is meant to indicate the outer surface 240 in total, or any portion thereof, without regard to geographic location along the spacer 206.

Likewise, for the purposes of the instant description, the inner surface 242 may be further categorized as 242A, 242B, or 242C, depending on where along the spacer 206 the inner surface 242 is geographically. To elaborate: 242A designates the inner surface 242 at main portion 250; 242B designates the inner surface 242 at the transition portion 260; and 242C designates the inner surface 242 at the lip portion 258. A reference to the inner surface 242 without the use of a letter is meant to indicate the inner surface 242 in total, or any portion thereof, without regard to geographic location along the spacer 206.

The spacer 206 may be formed from a polymeric material, or from any other material, such as plastic, metal, paper, cardboard, wood, paint, or fabric. The spacer 206 may be formed by injection molding. The spacer 206 may be formed from any other process, such as heat shrinking, where, the spacer is loosely disposed on at least a portion of the driveshaft end component 208 and heated, causing the polymeric heat-shrink material to contract around at least a portion of the driveshaft end component 208. Alternatively, the spacer may comprise a pliable substrate wrapped around at least a portion of the driveshaft end component 208. Further, the spacer may comprise a coating applied to at least a portion of the driveshaft end component 208, or as shown in FIG. 11A, the coating may be applied to the inner surface 214 of the receiving end portion 210. The spacer may comprise a UV-cured urethane coating on at least a portion of the driveshaft end component 208 or the inner surface 214 of the receiving end portion 210. Generally, the UV-cured urethane coating would be sprayed onto the desired component of the driveshaft assembly 200 and subsequently cured with UV light.

The driveshaft end component 208 is a rigid body comprising an insert end portion 262 in axial alignment with an attachment end portion 264 (shown in part). The driveshaft end component 208 may be formed by machining a blank, forging, or casting. The driveshaft end component 208 may be formed from a metal such as aluminum or steel. As shown, the driveshaft end component 208 is a unitary body, but it may be formed from a plurality of coupled components.

The insert end portion 262 comprises an end surface 266, an edge 268, a main insert portion 270, a shaft mounting seat 272, and a shaft catch surface 274, all in axial alignment with one another.

The edge 268 is formed at the boundary between the end surface 266 and the main insert portion 270. The edge 268 has a radius of curvature $C_2$.

The main insert portion 270 is an annular protrusion from the shaft mounting seat 272. As shown, the main insert portion 270 is substantially cylindrical and has a diameter 276 that is constant; however, as suggested in FIGS. 11B and 12, the main insert portion 270 may be tapered. Further, the main insert portion 270 may include features or be sized to facilitate welding the shaft 204 to the driveshaft end component 208.

The shaft mounting seat 272 is an annular protrusion from the attachment end portion 264 of the driveshaft end component 208. As shown, the shaft mounting seat 272 has a diameter 278 that is constant; however, the shaft mounting seat 272 may be tapered. Further, the shaft mounting seat 272 may include features or be sized to facilitate welding the shaft 204 to the driveshaft end component 208.

The shaft catch surface 274 is an annular, planar surface that defines the boundary between the insert end portion 262 and the attachment end portion 264. The shaft catch surface 274 preferably lies in a plane substantially transverse to the longitudinal axis 202 of the assembled driveshaft 200. However, the shaft catch surface 274 may also extend between the shaft mounting seat 272 and the attachment end portion 264 in ways other than transverse, such as angled or curvilinear.

The attachment end portion 264 includes a coupling end (not shown). The coupling end may comprise a yoke for coupling the driveshaft end component 208 to a universal joint, a constant velocity joint, or any other joint. Alternatively, the coupling end may include a plurality of splines formed thereon, gear teeth formed thereon, or the coupling end may include any other fitting.

The first outer diameter 236 of the spacer 206 is substantially the same as the receiving end portion inner diameter 220 of the shaft 204, thereby providing for an interference fit between the spacer 206 and the shaft 204 upon assembly of the driveshaft 200. Further, the receiving end portion inner diameter 220 of the shaft 204 is substantially the same as the diameter 278 of the shaft mounting seat 272 of the driveshaft end component 208, thereby by providing for an interference fit between the driveshaft end component 208 and the shaft 204 upon assembly of the driveshaft 200.

The first inner diameter 232 of the spacer 206, equal to a diameter of the second opening 256 encircled by the terminal surface 248, is less than the diameter 276 of the main insert portion 270.

The second inner diameter 234 of the spacer 206 is substantially the same as the diameter 276 of at least a portion of the main insert portion 270, thereby providing for an interference fit between the spacer 206 and at least a portion of the main insert portion 270.

The transition portion 260 has a radius of curvature, $C_1$, that is substantially the same as the radius of curvature, $C_2$, of the edge 268 formed between the end surface 266 and the main insert portion 270. That is, $C_1 \cong C_2$, thus allowing for substantially continuous contact between the inner surface 242 of the spacer 206 and at least a portion of the main insert portion 270 upon assembly of the driveshaft 200.

Upon assembly, the spacer 206 sits on at least a portion of the main insert portion 270 such that at least a first portion of the end surface 266 is visible through the second opening 256 and at least a second portion of the end surface 266 is in contact with the inner surface 242C. The inner surface 242A contacts at least a portion of the main insert portion 270 and inner surface 242B contacts edge 268.

The terminal surface 248 is not in contact with the main insert portion 270. If present, any tapered portion (not shown) may form a smooth, stepless transition from the outer surface 240 of the spacer 206 to the main insert portion 270.

Further, the shaft 204 sits on the insert end portion 262 such that the shaft mounting seat 272 is disposed within the hollow interior 216, forming an interference fit between the shaft mounting seat 272 and the inner surface 214 of the shaft 204. The terminus 222 of the wall 224 of the shaft 204 contacts the shaft catch surface 274. At least a portion of the outer surface 240 of the spacer 206 contacts the inner surface 214 of the shaft 204, forming an interference fit between the spacer 206 and the inner surface 214 of the shaft 204. Preferably, the portion of the outer surface 240 of the spacer 206 that contacts the inner surface 214 of the shaft 204 is the outer surface 240A at the main portion 250 of the spacer 206.

When the driveshaft assembly 200 is completed, the first receiving end portion 210 is coupled to the driveshaft end component 208 at the first receiving end portion 210 by a weld. The first receiving end portion 210 may be coupled to the driveshaft end component 208 by a magnetic pulse weld, a butt weld formed therebetween, an arc seam weld formed through the shaft 204, or by any other method of welding. Alternately, a plurality of fasteners (not shown) may be used to couple the first receiving end portion 210 to the driveshaft end component 208. When the plurality of fasteners is used to couple the first receiving end portion 210 to the driveshaft end component 208, the first receiving end portion 210 may include a mounting flange (not shown) for receiving the plurality of fasteners.

Figure 5:
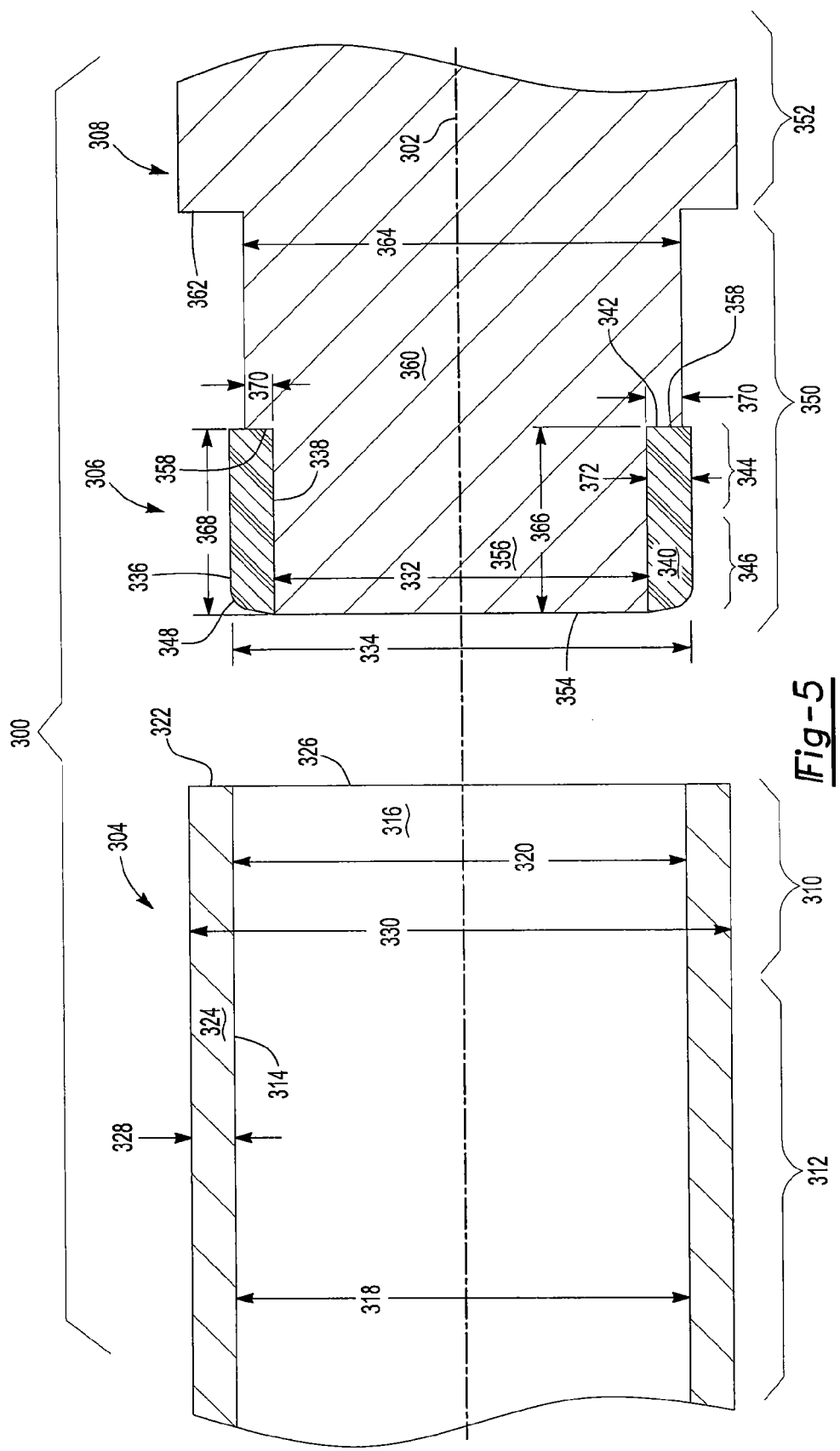
FIG. 5 is a partial, cross-sectional view of an embodiment of an exploded driveshaft assembly including a spacer according to yet another embodiment of the present invention.

FIG. 5 illustrates a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 300 is assembled along a longitudinal axis 302. The driveshaft assembly 300 includes a shaft 304, an annular spacer 306, and a driveshaft end component 308. As shown, the spacer 306 is disposed between a first receiving end portion 310 of the shaft 304 and a first driveshaft end component 308, but it is understood the spacer 306 may be disposed between a second receiving end portion (not shown) of the shaft 304 and a second driveshaft end component (not shown).

The shaft 304 is a tubular, elongate body comprising the first receiving end portion 310, the second receiving end portion (not shown), and a center shaft portion 312 (shown in part), wherein the center shaft portion 312 is bounded by the first 310 and second (not shown) receiving end portions. As shown in FIG. 5, the shaft 304 may be hollow, with an inner surface 314 and a hollow interior 316 extending along and through the shaft 304. The center shaft portion 312 of shaft 304 may have a center shaft portion inner diameter 318 that is substantially the same as a receiving end portion inner diameter 320 of either or both of the first 310 or second (not shown) receiving end portions. Alternatively, the center portion 312 of shaft 304 may have a center shaft portion inner diameter 318 that differs a receiving end portion inner diameter 320 of either or both of the first 310 or second (not shown) receiving end portions.

The first receiving end portion 310 comprises at least (i) a terminus 322 of wall 324 of the shaft 304 and (ii) an opening 326 to hollow interior 316, wherein the terminus 322 has a thickness 328 defined by the difference between the receiving end portion inner diameter 320 and the receiving end portion outer diameter 330.

The shaft 304 may be formed by extrusion, but other processes such as roll forming, tube milling, or machining may be used. The shaft 304 may be formed from aluminum, a steel, or any other metal. The shaft 304 may also be a composite shaft. A composite shaft is comprised of, for example, a non-metallic center portion, a metallic first distal end portion, and a metallic second distal end portion. The non-metallic center portion may be formed from carbon fiber.

The annular spacer 306 is a hollow, generally tubular shaped body, with an inner diameter 332 and an outer diameter 334. The spacer 306 also comprises an outer surface 336, an inner surface 338, an interior (not shown), and a wall 340 interposed between the outer 336 and inner 338 surfaces, said wall having a terminus 342. The spacer 306 also comprises a first end portion 344, comprising the terminus 342 and an opening (not shown) to the interior of the spacer 306. The spacer 306 also comprises a second end portion 346.

The second end portion 346 comprises a rounded edge 348 and an opening (not shown) to the interior of the spacer 306. While not shown in this figure, the first end portion 344 may further comprise a tapered portion such that the wall 340 of the spacer 306 may increase in thickness along the longitudinal axis 302 in the direction from the first end portion 344 of the spacer 306 towards the second end portion 346 of the spacer 306, thus forming any tapered portion. The wall 340 of the spacer, disregarding any tapered portion, may have a minimum thickness of 0.0003 inches.

The spacer 306 may be formed from a polymeric material, or from any other material, such as plastic, metal, paper, cardboard, wood, paint, or fabric. The spacer 306 may be formed by injection molding. The spacer 306 may be formed from any other process, such as heat shrinking, where, the spacer is loosely disposed on at least a portion of the driveshaft end component 308 and heated, causing the polymeric heat-shrink material to contract around at least a portion of the driveshaft end component 308. Alternatively, the spacer may comprise a pliable substrate wrapped around at least a portion of the driveshaft end component 308. Further, the spacer may comprise a coating applied to at least a portion of the driveshaft end component 308, or as shown in FIG. 11A, the coating may be applied to the inner surface 314 of the receiving end portion 310. The spacer may comprise a UV-cured urethane coating on at least a portion of the driveshaft end component 308 or the inner surface 314 of the receiving end portion 310. Generally, the UV-cured urethane coating would be sprayed onto the desired component of the driveshaft assembly 300 and subsequently cured with UV light.

The driveshaft end component 308 is a rigid body comprising an insert end portion 350 in axial alignment with an attachment end portion 352 (shown in part). The driveshaft end component 308 may be formed by machining a blank, forging, or casting. The driveshaft end component 308 may be formed from a metal such as aluminum or steel. As shown, the driveshaft end component 308 is a unitary body, but it may be formed from a plurality of coupled components.

The insert end portion 350 comprises an end surface 354, a spacer mounting seat 356, a spacer catch surface 358, a main insert portion 360, and a shaft catch surface 362, all in axial alignment with one another.

The spacer mounting seat 356 is an annular protrusion from the main insert portion 360. As shown, the spacer mounting seat 356 has a diameter 332 that is constant; however, the spacer mounting seat 356 may be tapered. Further, the spacer mounting seat 356 may include features or be sized to facilitate disposal of the spacer 306 on the driveshaft end component 308.

The spacer catch surface 358 is an annular, generally planar surface that defines the boundary between the spacer mounting seat 356 and the main insert portion 360. The spacer catch surface 358 preferably lies in a plane substantially transverse to the longitudinal axis 302 of the assembled driveshaft 300. However, the spacer catch surface 358 may also extend between the spacer mounting seat 356 and the main insert portion 360 in ways other than transverse, such as angled or curvilinear.

The main insert portion 360 is an annular protrusion from the attachment end portion 352. As shown, the main insert portion 360 is substantially cylindrical and has a diameter 364 that is constant; however, as suggested in FIGS. 11B and 12, the main insert portion 360 may be tapered. Further, the main insert portion 360 may include features or be sized to facilitate welding the shaft 304 to the driveshaft end component 308.

The shaft catch surface 362 is an annular, planar surface that defines the boundary between the insert end portion 350 and the attachment end portion 352. The shaft catch surface 362 preferably lies in a plane substantially transverse to the longitudinal axis 302 of the assembled driveshaft 300. However, the shaft catch surface 362 may also extend between the insert end portion 350 and the attachment end portion 352 in ways other than transverse, such as angled or curvilinear.

The attachment end portion 352 includes a coupling end (not shown). The coupling end may comprise a yoke for coupling the driveshaft end component 308 to a universal joint, a constant velocity joint, or any other joint. Alternatively, the coupling end may include a plurality of splines formed thereon, gear teeth formed thereon, or the coupling end may include any other fitting.

The outer diameter 334 of the spacer 306 is substantially the same as the receiving end portion inner diameter 320 of the shaft 304, thereby providing for an interference fit between the spacer 306 and the shaft 304 upon assembly of the driveshaft 300.

The inner diameter 332 of the spacer 306 is substantially the same as the diameter of the spacer mounting seat 356, thereby providing for an interference fit between the spacer 306 and the spacer mounting seat 356.

As shown in FIG. 5, the thickness 366 of the spacer mounting seat 356, measured as the distance along the longitudinal axis 302 between the end surface 354 and the spacer catch surface 358, may be substantially the same as a length 368 of the spacer 306, as measured along the longitudinal axis 302. However, the thickness 366 of the spacer mounting seat 356 may be such that the end surface 354 may protrude from or recess into, the opening (not shown) of the second end portion 346.

The spacer catch surface 358 may have a radial dimension 370 equal to the difference between the diameter 364 of the main insert portion 360 and the diameter 332, equal to the diameter of the of the spacer mounting seat 356.

Upon assembly, the spacer 306 sits on at least a portion of the insert end portion 350 such that spacer mounting seat 356 is disposed within the spacer 306 and the inner surface 338 contacts the spacer mounting seat 356.

The terminus 342 contacts the spacer catch surface 358. The thickness 372 of the terminus 342 may or may not be equal to the radial dimension 370 to the spacer catch surface 358. As shown in FIG. 5, the thickness 372 of the terminus 342 is greater than the radial dimension 370 of the spacer catch surface 358.

The end surface 354 would be visible in the opening (not shown) to the interior (not shown) of the spacer 306, but is not in contact with the spacer 306. The end surface 354 may be flush with the outer surface 336 of the spacer 306 or the end surface 354 may be recessed therefrom or protrude therefrom. If present, any tapered portion may form a smooth, stepless transition from the outer surface 336 of the spacer 306 to the main insert portion 360.

At least a portion of the outer surface 336 of the spacer 306 contacts the inner surface 314 of the shaft 304, forming an interference fit between the spacer 306 and the inner surface 314 of the shaft 304. When the assembly of the driveshaft is complete, the shaft 304 is coupled to at least one of: the insert end portion 350 and the attachment end portion 352. In some embodiments, the shaft 304 may sit on the insert end portion 350 such that the spacer 306, the spacer mounting seat 356, and the main insert portion 360 are all disposed within the hollow interior 316 and the terminus 322 of the wall 324 of the shaft 304 contacts the shaft catch surface 362.

When the driveshaft assembly 300 is completed, the first receiving end portion 310 is coupled to the driveshaft end component 308 at the first receiving end portion 310 by a weld. The first receiving end portion 310 may be coupled to the driveshaft end component 308 by a magnetic pulse weld, a butt weld formed therebetween, an arc seam weld formed through the shaft 304, or by any other method of welding. Alternately, a plurality of fasteners (not shown) may be used to couple the first receiving end portion 310 to the driveshaft end component 308. When the plurality of fasteners is used to couple the first receiving end portion 310 to the driveshaft end component 308, the first receiving end portion 310 may include a mounting flange (not shown) for receiving the plurality of fasteners.

Figure 6:
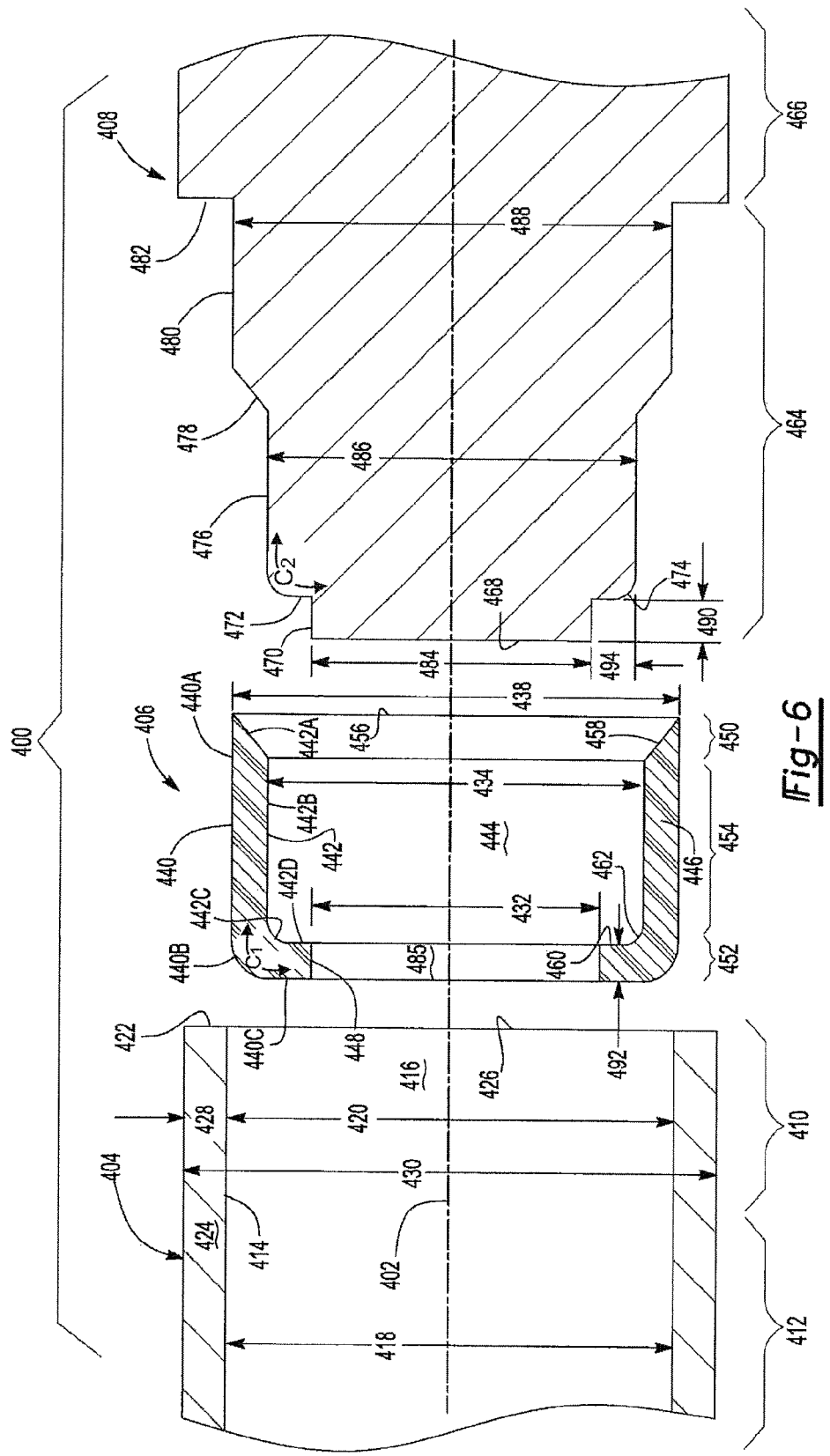
FIG. 6 is a partial, cross-sectional view of an embodiment of an exploded driveshaft assembly including a spacer according to yet another embodiment of the present invention.

FIG. 6 illustrates a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 400 is assembled along a longitudinal axis 402. The driveshaft assembly 400 includes a shaft 404, an annular spacer 406, and a driveshaft end component 408. As shown, the spacer 406 is disposed between a first receiving end portion 410 of the shaft 404 and a first driveshaft end component 408, but it is understood the spacer 406 may be disposed between a second receiving end portion (not shown) of the shaft 404 and a second driveshaft end component (not shown).

The shaft 404 is a tubular, elongate body comprising the first receiving end portion 410, the second receiving end portion (not shown), and a center shaft portion 412 (shown in part), wherein the center shaft portion 412 is bounded by the first 410 and second (not shown) receiving end portions. As shown in FIG. 6, the shaft 404 may be hollow, with an inner surface 414 and a hollow interior 416 extending along and through the shaft 404. The center shaft portion 412 of shaft 404 may have a center shaft portion inner diameter 418 that is substantially the same as a receiving end portion inner diameter 420 of either or both of the first 410 or second (not shown) receiving end portions. Alternatively, the center portion 412 of shaft 404 may have a center shaft portion inner diameter 418 that differs from a receiving end portion inner diameter 420 of either or both of the first 410 or second (not shown) receiving end portions.

The first receiving end portion 410 comprises at least (i) a terminus 422 of wall 424 of the shaft 404 and (ii) an opening 426 to hollow interior 416, wherein the terminus 422 has a thickness 428 defined by the difference between the receiving end portion inner diameter 420 and the receiving end portion outer diameter 430.

The shaft 404 may be formed by extrusion, but other processes such as roll forming, tube milling, or machining may be used. The shaft 404 may be formed from aluminum, a steel, or any other metal. The shaft 404 may also be a composite shaft. A composite shaft is comprised of, for example, a non-metallic center portion, a metallic first distal end portion, and a metallic second distal end portion. The non-metallic center portion may be formed from carbon fiber.

The annular spacer 406 is a hollow, generally tubular shaped body, with a first inner diameter 432, a second inner diameter 434, and an outer diameter 438. The spacer 406 also comprises an outer surface 440, an inner surface 442, an interior 444, a wall 446 interposed between the outer 440 and inner 442 surfaces, and a terminal surface 448. The spacer 406 also comprises a first end portion 450, a second end portion 452, and a center portion 454, wherein the center portion 454 is bounded by the first 450 and second 452 end portions.

A first opening 456 is disposed within the first end portion 450. The first end portion 450 may further comprise a tapered portion 458. The second end portion 452 comprises a lip portion 460 and a transition portion 462. The second end portion 452 is formed with the wall 446 of the spacer 406 bent in an arcuate fashion toward the interior 444 of the spacer 406. This arcuate bend in the wall 446 forms the transition portion 462 and has a radius of curvature $C_1$. The portion of the wall 446 that points to the interior 444 of the spacer 406 forms the lip portion 460. The lip portion 460 is unitary with the spacer 406 and may be substantially at a right angle to the center portion 454 of the spacer 406. The wall 446 of the spacer 406 may increase in thickness along the longitudinal axis 402 in the direction from the first opening 456 of the spacer 406 towards the center portion 454 of the spacer 406, thus forming the tapered portion 458. The wall 446 of the spacer, disregarding the tapered portion 458, may have a minimum thickness of 0.0003 inches.

For the purposes of the instant description, the outer surface 440 may be further categorized as 440A, 440B, or 440C, depending on where along the spacer 406 the outer surface 440 is geographically. To elaborate: 440A designates the outer surface 440 at both the tapered 458 and center 454 portions; 440B designates the outer surface 440 at the transition portion 462; and 440C designates the outer surface 440 at the lip portion 460. A reference to the outer surface 440 without the use of a letter is meant to indicate the outer surface 440 in total, or any portion thereof, without regard to geographic location along the spacer 406.

Likewise, for the purposes of the instant description, the inner surface 442 may be further categorized as 442A, 442B, 442C, or 442D depending on where along the spacer 406 the inner surface 442 is geographically. To elaborate: 442A designates the inner surface 442 at the tapered portion 458; 442B designates the inner surface 442 at the center portion 454; 442C designates the inner surface 442 at the transition portion 462; and 442D designates the inner surface 442 at the lip portion 460. A reference to the inner surface 442 without the use of a letter is meant to indicate the inner surface 442 in total, or any portion thereof, without regard to geographic location along the spacer 406.

The spacer 406 may be formed from a polymeric material, or from any other material, such as plastic, metal, paper, cardboard, wood, paint, or fabric. The spacer 406 may be formed by injection molding. The spacer 406 may be formed from any other process, such as heat shrinking, where, the spacer is loosely disposed on at least a portion of the driveshaft end component 408 and heated, causing the polymeric heat-shrink material to contract around at least a portion of the driveshaft end component 408. Alternatively, the spacer may comprise a pliable substrate wrapped around at least a portion of the driveshaft end component 408. Further, the spacer may comprise a coating applied to at least a portion of the driveshaft end component 408, or as shown in FIG. 11A, the coating may be applied to the inner surface 414 of the receiving end portion 410. The spacer may comprise a UV-cured urethane coating on at least a portion of the driveshaft end component 408 or the inner surface 414 of the receiving end portion 410. Generally, the UV-cured urethane coating would be sprayed onto the desired component of the driveshaft assembly 400 and subsequently cured with UV light.

The driveshaft end component 408 is a rigid body comprising an insert end portion 464 in axial alignment with an attachment end portion 466 (shown in part). The driveshaft end component 408 may be formed by machining a blank, forging, or casting. The driveshaft end component 408 may be formed from a metal such as aluminum or steel. As shown, the driveshaft end component 408 is a unitary body, but it may be formed from a plurality of coupled components.

The insert end portion 464 comprises an end surface 468, a spacer mounting seat 470, a spacer catch surface 472, an edge 474, a main insert portion 476, an insert bevel 478, a shaft mounting seat 480, and a shaft catch surface 482, all in axial alignment with one another.

The spacer mounting seat 470 is an annular protrusion from the main insert portion 476. As shown, the spacer mounting seat 470 has a diameter 484 that is constant; however, the spacer mounting seat 470 may be tapered.

The spacer catch surface 472 is an annular, generally planar surface that defines the boundary between the spacer mounting seat 470 and the main insert portion 476. The spacer catch surface 472 preferably lies in a plane substantially transverse to the longitudinal axis 402 of the assembled driveshaft 400. However, the spacer catch surface 472 may also extend between the spacer mounting seat 470 and the main insert portion 476 in ways other than transverse, such as angled or curvilinear.

The main insert portion 476 is an annular protrusion from the shaft mounting seat 480. As shown, the main insert portion 476 is substantially cylindrical and has a diameter 486 that is constant; however, the main insert portion 476 may be tapered. Further, the main insert portion 476 may include features or be sized to facilitate welding the shaft 404 to the driveshaft end component 408.

The edge 474 is formed at the boundary between the spacer catch surface 472 and the main insert portion 476. The edge 474 has a radius of curvature $C_2$.

As depicted in FIG. 6, the diameter 486 of the main insert portion 476 has a smaller diameter than the diameter 488 shaft mounting seat 480 and the insert bevel 478 forms a transition between the main insert portion 476 and the shaft mounting seat 480.

The shaft mounting seat 480 is an annular protrusion from the attachment end portion 466 of the driveshaft end component 408. As shown, the shaft mounting seat 480 is substantially cylindrical and has a diameter 488 that is constant; however, as suggested in FIGS. 11B and 12, the shaft mounting seat 480 may be tapered. Further, the shaft mounting seat 480 may include features or be sized to facilitate welding the shaft 404 to the driveshaft end component 408.

The shaft catch surface 482 is an annular, planar surface that defines the boundary between the insert end portion 464 and the attachment end portion 466. The shaft catch surface 482 preferably lies in a plane substantially transverse to the longitudinal axis 402 of the assembled driveshaft 400. However, the shaft catch surface 482 may also extend between the shaft mounting seat 480 and the attachment end portion 466 in ways other than transverse, such as angled or curvilinear.

The attachment end portion 466 includes a coupling end (not shown). The coupling end may comprise a yoke for coupling the driveshaft end component 408 to a universal joint, a constant velocity joint, or any other joint. Alternatively, the coupling end may include a plurality of splines formed thereon, gear teeth formed thereon, or the coupling end may include any other fitting.

The outer diameter 438 of the spacer 406 is substantially the same as the receiving end portion inner diameter 420 of the shaft 404, thereby providing for an interference fit between the spacer 406 and the shaft 404 upon assembly of the driveshaft 400. Further, the receiving end portion inner diameter 420 of the shaft 404 may be substantially the same as the diameter 488 of at least a portion of the shaft mounting seat 480 of the driveshaft end component 408, thereby by providing for an interference fit between the driveshaft end component 408 and the shaft 404 upon assembly of the driveshaft 400.

The first inner diameter 432 of the spacer 406, equal to a diameter of a second opening 485 to the interior 444 encircled by the terminal surface 448, is substantially the same as the diameter 484 of the spacer mounting seat 470, thereby providing for an interference fit between the spacer 406 and the spacer mounting seat 470.

The second inner diameter 434 of the spacer 406 is substantially the same as the diameter 486 of at least a portion of the main insert portion 476, thereby providing for an interference fit between the spacer 406 and at least a portion of the main insert portion 476.

The thickness 490 of the spacer mounting seat 470, measured as the distance along the longitudinal axis 402 between the end surface 468 and the spacer catch surface 472, may be substantially the same as a length 492 of the terminal surface 448, as measured along the longitudinal axis 402. However, the thickness 490 of the spacer mounting seat 470 may be such that the end surface 468 may be recessed from, or protrude from, the second opening 485 of spacer 406.

The spacer catch surface 472 may have a radial dimension 494 equal to the difference between the diameter 486 of the main insert portion 476 and the diameter 484 of the spacer mounting seat 470.

The transition portion 462 has a radius of curvature, $C_1$, that is substantially the same as the radius of curvature, $C_2$, of the edge 474 formed between the spacer catch surface 472 and the main insert portion 476. That is, $C_1 \cong C_2$, thus allowing for substantially continuous contact between the inner surface 442 of the spacer 406 and at least a portion of the insert end portion 464 upon assembly of the driveshaft 400.

Upon assembly, the spacer 406 sits on at least a portion of the insert end portion 464 such that the end surface 468 and spacer mounting seat 470 are disposed within the second opening 485. The inner surface 442A contacts the insert bevel 478. The inner surface 442B contacts at least a portion of the main insert portion 476. The inner surface 442C contacts edge 474. And, the inner surface 442D contacts the spacer catch surface 472.

The terminal surface 448 contacts the spacer mounting seat 470, and end surface 468 would be visible through the second opening 485 and is not in contact with the spacer 406. The end surface 468 may be flush with the outer surface 440 of the spacer 406 or the end surface 468 may be recessed therefrom or protrude therefrom. If present, the tapered portion 458 may form a smooth, stepless transition from the outer surface 440 of the spacer 406 to the shaft mounting seat 480.

Further, the shaft 404 sits on the insert end portion 464 such that the shaft mounting seat 480 is disposed within the hollow interior 416, forming an interference fit between the shaft mounting seat 480 and the inner surface 414 of the shaft 404. The terminus 422 of the wall 424 of the shaft 404 contacts the shaft catch surface 482. At least a portion of the outer surface 440 of the spacer 406 contacts the inner surface 414 of the shaft 404, forming an interference fit between the spacer 406 and the inner surface 414 of the shaft 404. Preferably, the portion of the outer surface 440 of the spacer 406 that contacts the inner surface 414 of the shaft 404 is the outer surface 440A at the tapered 458 and center 454 portions of the spacer 406.

When the driveshaft assembly 400 is completed, the first receiving end portion 410 is coupled to the driveshaft end component 408 at the first receiving end portion 410 by a weld. The first receiving end portion 410 may be coupled to the driveshaft end component 408 by a magnetic pulse weld, a butt weld formed therebetween, an arc seam weld formed through the shaft 404, or by any other method of welding. Alternately, a plurality of fasteners (not shown) may be used to couple the first receiving end portion 410 to the driveshaft end component 408. When the plurality of fasteners is used to couple the first receiving end portion 410 to the driveshaft end component 408, the first receiving end portion 410 may include a mounting flange (not shown) for receiving the plurality of fasteners.

Figure 7:
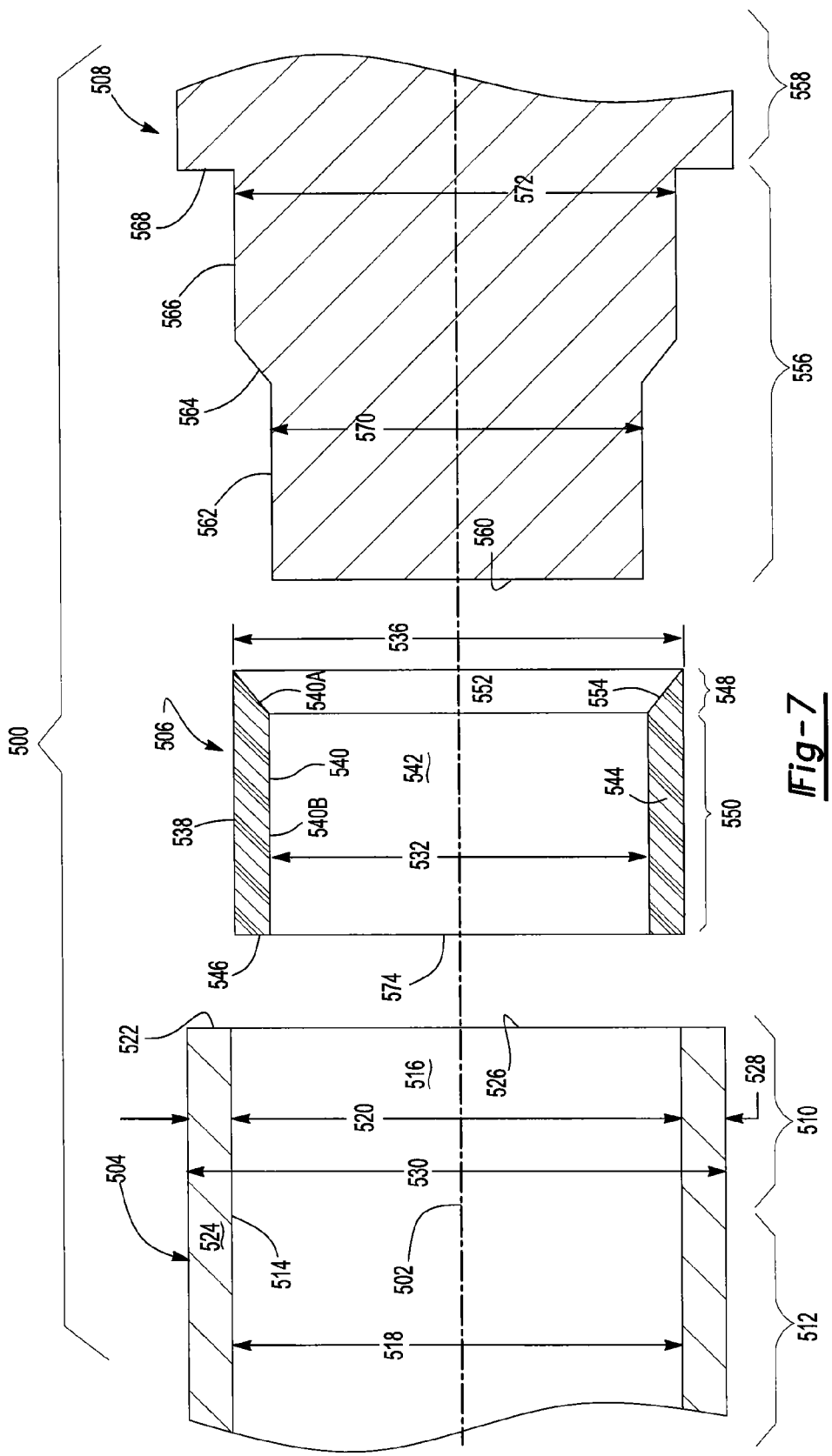
FIG. 7 is a partial, cross-sectional view of an embodiment of an exploded driveshaft assembly including a spacer according to yet another embodiment of the present invention.

FIG. 7 illustrates a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 500 is assembled along a longitudinal axis 502. The driveshaft assembly 500 includes a shaft 504, an annular spacer 506, and a driveshaft end component 508. As shown, the spacer 506 is disposed between a first receiving end portion 510 of the shaft 504 and a first driveshaft end component 508, but it is understood the spacer 506 may be disposed between a second receiving end portion (not shown) of the shaft 504 and a second driveshaft end component (not shown).

The shaft 504 is a tubular, elongate body comprising the first receiving end portion 510, the second receiving end portion (not shown), and a center shaft portion 512 (shown in part), wherein the center shaft portion 512 is bounded by the first 510 and second (not shown) receiving end portions. As shown in FIG. 7, the shaft 504 may be hollow, with an inner surface 514 and a hollow interior 516 extending along and through the shaft 504. The center shaft portion 512 of shaft 504 may have a center shaft portion inner diameter 518 that is substantially the same as a receiving end portion inner diameter 520 of either or both of the first 510 or second (not shown) receiving end portions. Alternatively, the center portion 512 of shaft 504 may have a center shaft portion inner diameter 518 that differs from a receiving end portion inner diameter 520 of either or both of the first 510 or second (not shown) receiving end portions.

The first receiving end portion 510 comprises at least (i) a terminus 522 of wall 524 of the shaft 504 and (ii) an opening 526 to hollow interior 516, wherein the terminus 522 has a thickness 528 defined by the difference between the receiving end portion inner diameter 520 and the receiving end portion outer diameter 530.

The shaft 504 may be formed by extrusion, but other processes such as roll forming, tube milling, or machining may be used. The shaft 504 may be formed from aluminum, a steel, or any other metal. The shaft 504 may also be a composite shaft. A composite shaft is comprised of, for example, a non-metallic center portion, a metallic first distal end portion, and a metallic second distal end portion. The non-metallic center portion may be formed from carbon fiber.

The annular spacer 506 is a hollow, generally tubular shaped body, with an inner diameter 532 and an outer diameter 536. The spacer 506 also comprises an outer surface 538, an inner surface 540, an interior 542, a wall 544 interposed between the outer 538 and inner 540 surfaces, and a terminal surface 546. The spacer 506 also comprises a first end portion 548 and a main portion 550.

A first opening 552 is disposed within the first end portion 548. The first end portion 548 may further comprise a tapered portion 554. The wall 544 of the spacer 506 may increase in thickness along the longitudinal axis 502 in the direction from the first opening 552 of the spacer 506 towards the main portion 550 of the spacer 506, thus forming the tapered portion 554. The wall 544 of the spacer, disregarding the tapered portion 554, may have a minimum thickness of 0.0003 inches.

For the purposes of the instant description, the inner surface 540 may be further categorized as 540A or 540B, depending on where along the spacer 506 the inner surface 540 is geographically. To elaborate: 540A designates the inner surface 540 at the tapered portion 554 and 540B designates the inner surface 540 at the main portion 550. A reference to the inner surface 540 without the use of a letter is meant to indicate the inner surface 540 in total, or any portion thereof, without regard to geographic location along the spacer 506.

The spacer 506 may be formed from a polymeric material, or from any other material, such as plastic, metal, paper, cardboard, wood, paint, or fabric. The spacer 506 may be formed by injection molding. The spacer 506 may be formed from any other process, such as heat shrinking, where, the spacer is loosely disposed on at least a portion of the driveshaft end component 508 and heated, causing the polymeric heat-shrink material to contract around at least a portion of the driveshaft end component 508. Alternatively, the spacer may comprise a pliable substrate wrapped around at least a portion of the driveshaft end component 508. Further, the spacer may comprise a coating applied to at least a portion of the driveshaft end component 508, or as shown in FIG. 11A, the coating may be applied to the inner surface 514 of the receiving end portion 510. The spacer may comprise a UV-cured urethane coating on at least a portion of the driveshaft end component 508 or the inner surface 514 of the receiving end portion 510. Generally, the UV-cured urethane coating would be sprayed onto the desired component of the driveshaft assembly 500 and subsequently cured with UV light.

The driveshaft end component 508 is a rigid body comprising an insert end portion 556 in axial alignment with an attachment end portion 558 (shown in part). The driveshaft end component 508 may be formed by machining a blank, forging, or casting. The driveshaft end component 508 may be formed from a metal such as aluminum or steel. As shown, the driveshaft end component 508 is a unitary body, but it may be formed from a plurality of coupled components.

The insert end portion 556 comprises an end surface 560, a main insert portion 562, an insert bevel 564, a shaft mounting seat 566, and a shaft catch surface 568, all in axial alignment with one another.

The main insert portion 562 may be substantially cylindrical having a constant diameter of 570, but may also be tapered or contain other geographical features. The main insert portion 562 is an annular protrusion from the shaft mounting seat 566.

As depicted in FIG. 7, the diameter 570 of the main insert portion 562 has a smaller diameter than a diameter 572 of the shaft mounting seat 566 and the insert bevel 564 forms a transition between the main insert portion 562 and the shaft mounting seat 566.

The shaft mounting seat 566 is an annular protrusion from the attachment end portion 558 of the driveshaft end component 508. As shown, the shaft mounting seat 566 is substantially cylindrical and has a diameter 572 that is substantially constant; however, as suggested in FIGS. 11B and 12, the shaft mounting seat 566 may be tapered. Further, the shaft mounting seat 566 may include features or be sized to facilitate welding the shaft 504 to the driveshaft end component 508.

The shaft catch surface 568 is an annular, planar surface that defines the boundary between the insert end portion 556 and the attachment end portion 558. The shaft catch surface 568 preferably lies in a plane substantially transverse to the longitudinal axis 502 of the assembled driveshaft 500. However, the shaft catch surface 568 may also extend between the shaft mounting seat 566 and the attachment end portion 558 in ways other than transverse, such as angled or curvilinear.

The attachment end portion 558 includes a coupling end (not shown). The coupling end may comprise a yoke for coupling the driveshaft end component 508 to a universal joint, a constant velocity joint, or any other joint. Alternatively, the coupling end may include a plurality of splines formed thereon, gear teeth formed thereon, or the coupling end may include any other fitting.

The outer diameter 536 of the spacer 506 is substantially the same as the receiving end portion inner diameter 520 of the shaft 504, thereby providing for an interference fit between the spacer 506 and the shaft 504 upon assembly of the driveshaft 500. Further, the receiving end portion inner diameter 520 of the shaft 504 is substantially the same as the diameter 572 of the shaft mounting seat 566 of the driveshaft end component 508, thereby by providing for an interference fit between the driveshaft end component 508 and the shaft 504 upon assembly of the driveshaft 500.

The inner diameter 532 of the spacer 506 is substantially the same as the diameter 570 of the main insert portion 562, thereby providing for an interference fit between the spacer 506 and the main insert portion 562.

Upon assembly, the spacer 506 sits on at least a portion of the insert end portion 556 such that the end surface 560 and main insert portion 562 are disposed within the spacer 506. The inner surface 540A contacts the insert bevel 564 and the inner surface 540B contacts at least a portion of the main insert portion 562.

The terminal surface 546 does not contact either the driveshaft end component 508 or the shaft 504. End surface 560 would be visible through a second opening 574 to the interior 542 of the spacer 506 but is not in contact with the spacer 506. The end surface 560 may be flush with the terminal surface 546 of the spacer 506 or the end surface 560 may be recessed therefrom or protrude therefrom. If present, the tapered portion 554 may form a smooth, stepless transition from the outer surface 538 of the spacer 506 to the shaft mounting seat 566.

Further, the shaft 504 sits on the insert end portion 556 such that the shaft mounting seat 566 is disposed within the hollow interior 516, forming an interference fit between the shaft mounting seat 566 and the inner surface 514 of the shaft 504. The terminus 522 of the wall 524 of the shaft 504 contacts the shaft catch surface 568. At least a portion of the outer surface 538 of the spacer 506 contacts the inner surface 514 of the shaft 504, forming an interference fit between the spacer 506 and the inner surface 514 of the shaft 504.

When the driveshaft assembly 500 is completed, the first receiving end portion 510 is coupled to the driveshaft end component 508 at the first receiving end portion 510 by a weld. The first receiving end portion 510 may be coupled to the driveshaft end component 508 by a magnetic pulse weld, a butt weld formed therebetween, an arc seam weld formed through the shaft 504, or by any other method of welding. Alternately, a plurality of fasteners (not shown) may be used to couple the first receiving end portion 510 to the driveshaft end component 508. When the plurality of fasteners is used to couple the first receiving end portion 510 to the driveshaft end component 508, the first receiving end portion 510 may include a mounting flange (not shown) for receiving the plurality of fasteners.

Figure 8:
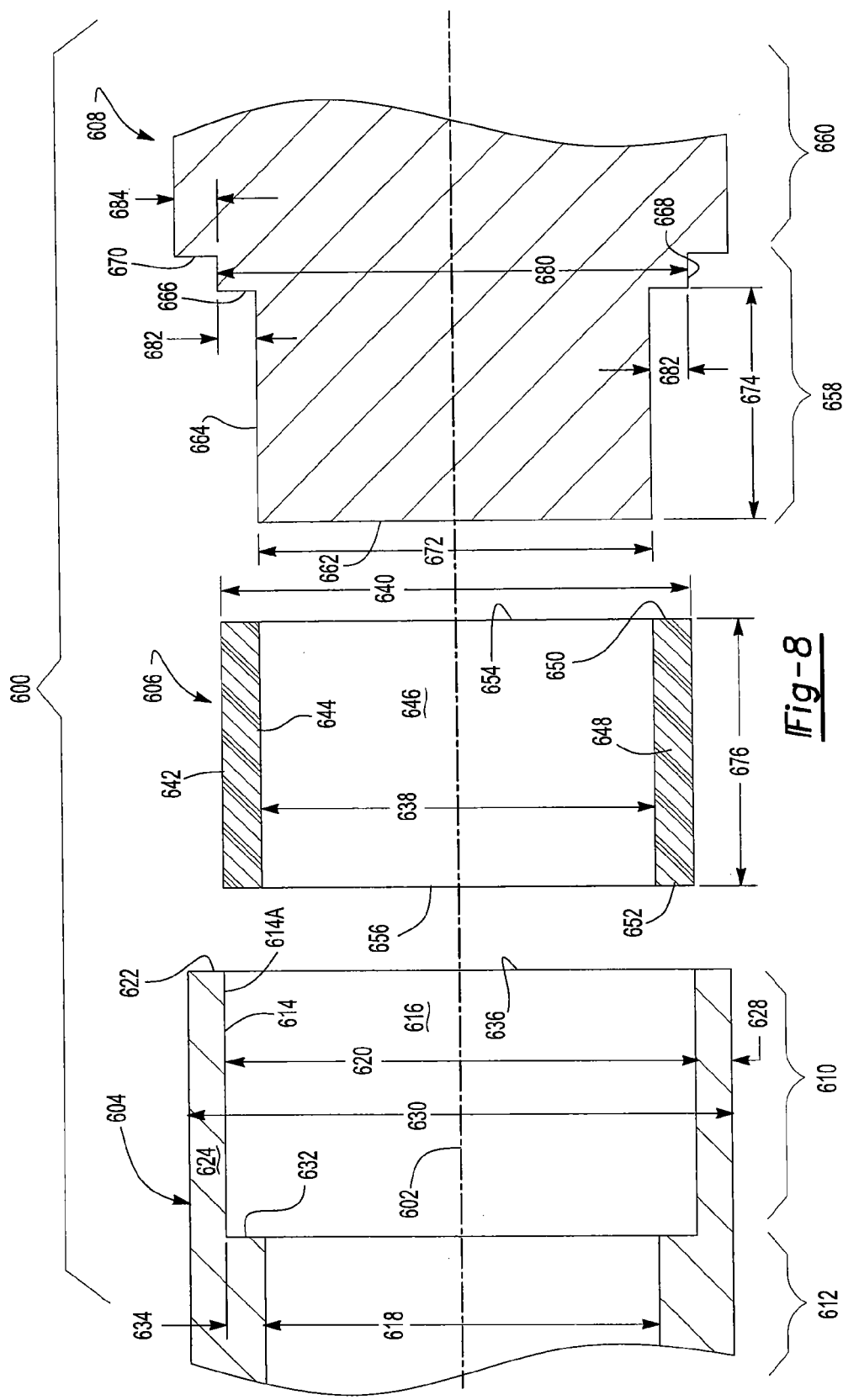
FIG. 8 is a partial, cross-sectional view of an embodiment of an exploded driveshaft assembly including a spacer according to yet another embodiment of the present invention.

FIG. 8 illustrates a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 600 is assembled along a longitudinal axis 602. The driveshaft assembly 600 includes a shaft 604, an annular spacer 606, and a driveshaft end component 608. As shown, the spacer 606 is disposed between a first receiving end portion 610 of the shaft 604 and a first driveshaft end component 608, but it is understood the spacer 606 may be disposed between a second receiving end portion (not shown) of the shaft 604 and a second driveshaft end component (not shown).

The shaft 604 is a tubular, elongate body comprising the first receiving end portion 610, the second receiving end portion (not shown), and a center shaft portion 612 (shown in part), wherein the center shaft portion 612 is bounded by the first 610 and second (not shown) receiving end portions. As shown in FIG. 8, the shaft 604 may be hollow, with an inner surface 614 and a hollow interior 616 extending along and through the shaft 604. The center shaft portion 612 of shaft 604 may have a center shaft portion inner diameter 618 that is substantially the same as a receiving end portion inner diameter 620 of either or both of the first 610 or second (not shown) receiving end portions. However, as depicted in FIG. 8, the center portion 612 of shaft 604 may have a center shaft portion inner diameter 618 that differs from a receiving end portion inner diameter 620 of either or both of the first 610 or second (not shown) receiving end portions. The first 610 or second (not shown) receiving end portions may be formed by machining the shaft 604 in a secondary operation, but may also be formed by any other method.

The first receiving end portion 610 comprises at least (i) a first terminus 622 of wall 624, wherein the first terminus 622 has a thickness 628 defined by the difference between the receiving end portion inner diameter 620 and the receiving end portion outer diameter 630, (ii) a second terminus 632, wherein the second terminus 632 has a thickness 634 defined by the difference between the receiving end portion inner diameter 620 and the center portion inner diameter 618, and (iii) an opening 636 to hollow interior 616.

The shaft 604 may be formed by extrusion, but other processes such as roll forming, tube milling, or machining may be used. The shaft 604 may be formed from aluminum, a steel, or any other metal. The shaft 604 may also be a composite shaft. A composite shaft is comprised of, for example, a non-metallic center portion, a metallic first distal end portion, and a metallic second distal end portion. The non-metallic center portion may be formed from carbon fiber.

The annular spacer 606 is a hollow, generally tubular shaped body, with an inner diameter 638, an outer diameter 640, an outer surface 642, an inner surface 644, an interior 646, a wall 648 interposed between the outer 642 and inner 644 surfaces, a first terminal surface 650, and a second terminal surface 652. The wall 648 of spacer 606 may be tapered at the first 650 or second 652 terminal surfaces or at any portion adjacent thereto. The spacer 606 further comprises first 654 and second 656 openings to the interior 646 of the spacer 606. The wall 648 of the spacer, disregarding any tapered portion, may have a minimum thickness of 0.0003 inches.

The spacer 606 may be formed from a polymeric material, or from any other material, such as plastic, metal, paper, cardboard, wood, paint, or fabric. The spacer 606 may be formed by injection molding. The spacer 606 may be formed from any other process, such as heat shrinking, where, the spacer is loosely disposed on at least a portion of the driveshaft end component 608 and heated, causing the polymeric heat-shrink material to contract around at least a portion of the driveshaft end component 608. Alternatively, the spacer may comprise a pliable substrate wrapped around at least a portion of the driveshaft end component 608. Further, the spacer may comprise a coating applied to at least a portion of the driveshaft end component 608, or as shown in FIG. 11A, the coating may be applied to the inner surface 614A of the receiving end portion 610. The spacer may comprise a UV-cured urethane coating on at least a portion of the driveshaft end component 608 or the inner surface 614A of the receiving end portion 610. Generally, the UV-cured urethane coating would be sprayed onto the desired component of the driveshaft assembly 600 and subsequently cured with UV light.

The driveshaft end component 608 is a rigid body comprising an insert end portion 658 in axial alignment with an attachment end portion 660 (shown in part). The driveshaft end component 608 may be formed by machining a blank, forging, or casting. The driveshaft end component 608 may be formed from a metal such as aluminum or steel. As shown, the driveshaft end component 608 is a unitary body, but it may be formed from a plurality of coupled components.

The insert end portion 658 comprises an end surface 662, a spacer mounting seat 664, a spacer catch surface 666, a shaft mounting seat 668, and a shaft catch surface 670, all in axial alignment with one another.

The spacer mounting seat 664 is an annular protrusion from the shaft mounting seat 668. As shown, the spacer mounting seat 664 is substantially cylindrical and has a diameter 672 that is constant; however, as suggested in FIGS. 11B and 12, the spacer mounting seat 664 may be tapered. Further, the spacer mounting seat 664 may include features or be sized to facilitate welding the shaft 604 to the driveshaft end component 608.

The spacer catch surface 666 is an annular, planar surface that defines the boundary between the spacer mounting seat 664 and the shaft mounting seat 668. The spacer catch surface 666 preferably lies in a plane substantially transverse to the longitudinal axis 602 of the assembled driveshaft 600. However, the spacer catch surface 666 may also extend between the spacer mounting seat 664 and the shaft mounting seat 668 in ways other than transverse, such as angled or curvilinear.

The shaft mounting seat 668 is an annular protrusion from the attachment end portion 660 of the driveshaft end component 608. As shown, the shaft mounting seat 668 has a diameter 680 that is constant; however, the shaft mounting seat 668 may be tapered. Further, the shaft mounting seat 668 may include features or be sized to facilitate welding the shaft 604 to the driveshaft end component 608.

The shaft catch surface 670 is an annular, planar surface that defines the boundary between the insert end portion 658 and the attachment end portion 660. The shaft catch surface 670 preferably lies in a plane substantially transverse to the longitudinal axis 602 of the assembled driveshaft 600. However, the shaft catch surface 670 may also extend between the shaft mounting seat 668 and the attachment end portion 660 in ways other than transverse, such as angled or curvilinear.

The attachment end portion 660 includes a coupling end (not shown). The coupling end may comprise a yoke for coupling the driveshaft end component 608 to a universal joint, a constant velocity joint, or any other joint. Alternatively, the coupling end may include a plurality of splines formed thereon, gear teeth formed thereon, or the coupling end may include any other fitting.

The outer diameter 640 of the spacer 606 is substantially the same as the receiving end portion inner diameter 620 of the shaft 604, thereby providing for an interference fit between the spacer 606 and the shaft 604 upon assembly of the driveshaft 600.

The inner diameter 638 of the spacer 606 is substantially the same as the diameter 672 of at least a portion of the spacer mounting seat 664, thereby providing for an interference fit between the spacer 606 and at least a portion of the spacer mounting seat 664.

The thickness 674 of the spacer mounting seat 664, measured as the distance along the longitudinal axis 602 between the end surface 662 and the spacer catch surface 666, may be substantially the same as a length 676 of the spacer 606, as measured along the longitudinal axis 602. However, the thickness 674 of the spacer mounting seat 664 may be such that the end surface 662 may be recessed from, or protrude from, the second opening 656 of spacer 606. Further, the length 676 of the spacer 606 may be less than the thickness 674 of the spacer mounting seat 664 such that the first terminal surface 650 does not contact the spacer catch surface 666.

The spacer catch surface 666 may have a radial dimension 682 equal to the difference between the diameter 672 of the spacer mounting seat 664 and the diameter 680 of the shaft mounting seat 668. The radial dimension 682 may or may not be equal to the difference between the inner 638 and outer 640 diameters of the spacer 606.

The shaft catch surface 670 has a radial dimension 684 that may or may not be equal to the thickness 622 of wall 624 of the shaft 604.

Upon assembly, the spacer 606 sits on at least a portion of the insert end portion 658 such that at least a portion of the spacer mounting seat 664 is disposed within the spacer 606 and the inner surface 644 contacts at least a portion of the spacer mounting seat 664.

The second terminal surface 652 contacts the second terminus 632. As noted above, the first terminal surface 650 may be in contact with the spacer catch surface 666. Alternatively, the first terminal surface 650 may not be in contact with the spacer catch surface 666. End surface 662 would be visible through the second opening 656 and is not in contact with the spacer 606. The end surface 662 may be flush with the second terminal surface 652 of the spacer 606 or the end surface 662 may be recessed therefrom or protrude therefrom. If present, any tapered portion may form a smooth, stepless transition from the spacer 606 to either or both the shaft 604 or the driveshaft end component 608.

Further, the shaft 604 may sit on the insert end portion 658 such that the first terminus 622 of the wall 624 of the shaft 604 contacts the shaft catch surface 670. At least a portion of the outer surface 642 of the spacer 606 contacts the inner surface 614 of the shaft 604, forming an interference fit between the spacer 606 and the inner surface 614 of the shaft 604. Preferably, the outer surface 642 of the spacer 606 contacts the inner surface 614 at the receiving end portion 610, designated as 614A.

When the driveshaft assembly 600 is completed, the first receiving end portion 610 is coupled to the driveshaft end component 608 at the first receiving end portion 610 by a weld. The first receiving end portion 610 may be coupled to the driveshaft end component 608 by a magnetic pulse weld, a butt weld formed therebetween, an arc seam weld formed through the shaft 604, or by any other method of welding. Alternately, a plurality of fasteners (not shown) may be used to couple the first receiving end portion 610 to the driveshaft end component 608. When the plurality of fasteners is used to couple the first receiving end portion 610 to the driveshaft end component 608, the first receiving end portion 610 may include a mounting flange (not shown) for receiving the plurality of fasteners.

Figure 9:
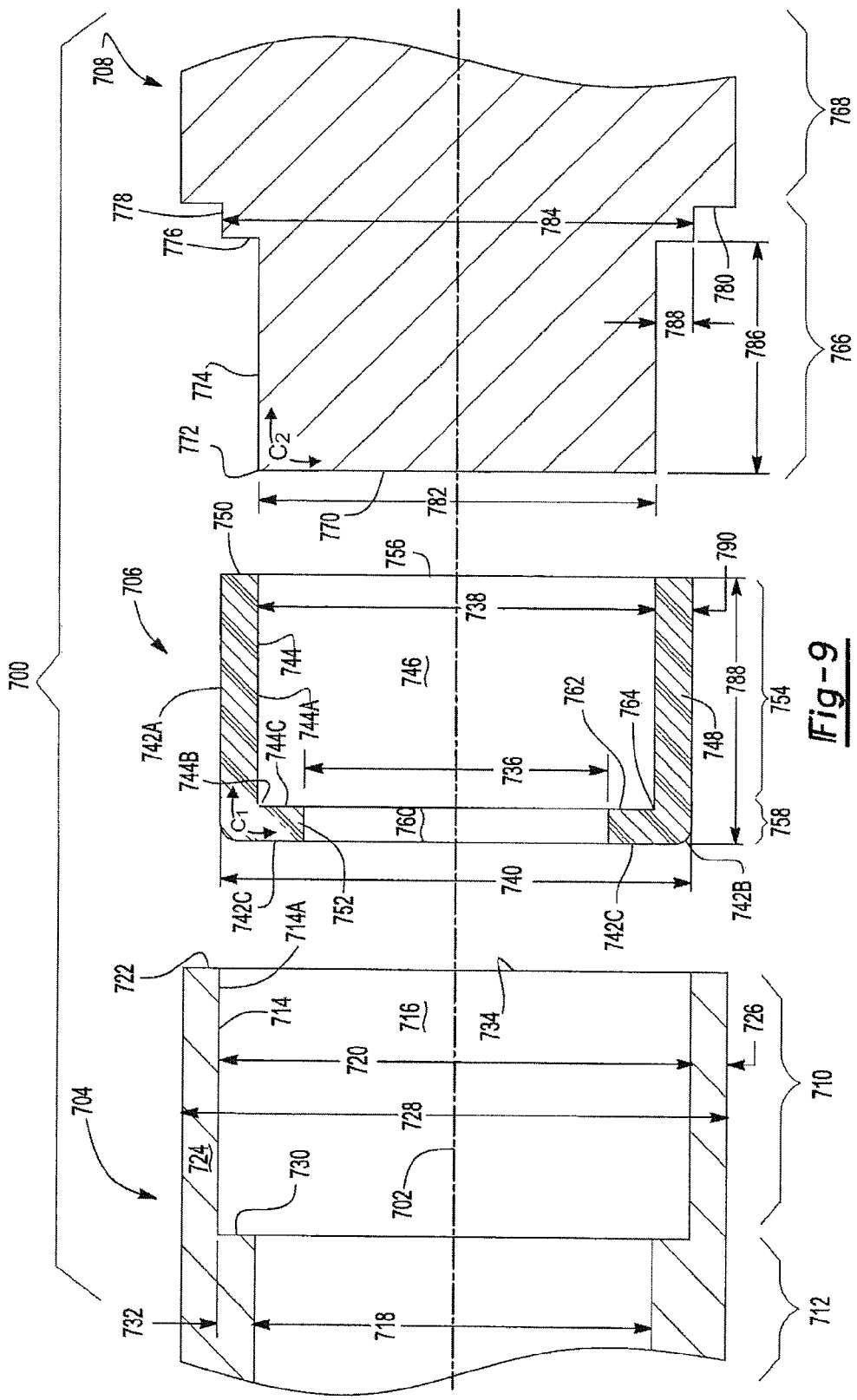
FIG. 9 is a partial, cross-sectional view of an embodiment of an exploded driveshaft assembly including a spacer according to yet another embodiment of the present invention.

FIG. 9 illustrates a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 700 is assembled along a longitudinal axis 702. The driveshaft assembly 700 includes a shaft 704, an annular spacer 706, and a driveshaft end component 708. As shown, the spacer 706 is disposed between a first receiving end portion 710 of the shaft 704 and a first driveshaft end component 708, but it is understood the spacer 706 may be disposed between a second receiving end portion (not shown) of the shaft 704 and a second driveshaft end component (not shown).

The shaft 704 is a tubular, elongate body comprising the first receiving end portion 710, the second receiving end portion (not shown), and a center shaft portion 712 (shown in part), wherein the center shaft portion 712 is bounded by the first 710 and second (not shown) receiving end portions. As shown in FIG. 9, the shaft 704 may be hollow, with an inner surface 714 and a hollow interior 716 extending along and through the shaft 704. The center shaft portion 712 of shaft 704 may have a center shaft portion inner diameter 718 that is substantially the same as a receiving end portion inner diameter 720 of either or both of the first 710 or second (not shown) receiving end portions. Alternatively, the center portion 712 of shaft 704 may have a center shaft portion inner diameter 718 that differs from a receiving end portion inner diameter 720 of either or both of the first 710 or second (not shown) receiving end portions. As depicted in FIG. 9, the center portion 712 of shaft 704 has a center shaft portion inner diameter 718 that is less than the receiving end portion inner diameter 720. The first 710 or second (not shown) receiving end portions may be formed by machining the shaft 704 in a secondary operation, but may also be formed by any other method.

The first receiving end portion 710 comprises at least (i) a first terminus 722 of wall 724, wherein the first terminus 722 has a thickness 726 defined by the difference between the receiving end portion inner diameter 720 and the receiving end portion outer diameter 728, (ii) a second terminus 730, wherein the second terminus 730 has a thickness 732 defined by the difference between the receiving end portion inner diameter 720 and the center portion inner diameter 718, and (ii) an opening 734 to hollow interior 716.

The shaft 704 may be formed by extrusion, but other processes such as roll forming, tube milling, or machining may be used. The shaft 704 may be formed from aluminum, a steel, or any other metal. The shaft 704 may also be a composite shaft. A composite shaft is comprised of, for example, a non-metallic center portion, a metallic first distal end portion, and a metallic second distal end portion. The non-metallic center portion may be formed from carbon fiber.

The annular spacer 706 is a hollow, generally tubular shaped body, with a first inner diameter 736, a second inner diameter 738, and a first outer diameter 740. The spacer 706 also comprises an outer surface 742, an inner surface 744, an interior 746, a wall 748 interposed between the outer 742 and inner 744 surfaces, and a first terminal surface 750 and a second terminal surface 752. The spacer 706 also comprises a main portion 754, with a first opening 756 to the interior 746 disposed therein, and an end portion 758, with a second opening 760 to the interior 746 disposed therein.

The main portion 754 may further comprise a tapered portion (not shown). The end portion 758 comprises a lip portion 762 and a transition portion 764. The end portion 758 is formed with the wall 748 of the spacer 706 bent in an arcuate fashion toward the interior 746 of the spacer 706. This arcuate bend in the wall 748 forms the transition portion 764 and has a radius of curvature $C_1$. The portion of the wall 748 that points to the interior 746 of the spacer 706 forms the lip portion 762. The lip portion 762 is unitary with the spacer 706 and may be substantially at a right angle to the main portion 754 of the spacer 706. The wall 748 of the spacer 706 may increase in thickness along the longitudinal axis 702 in the direction from the first opening 756 of the spacer 706 towards the end portion 758 of the spacer 706, thus forming a tapered portion (not shown). The wall 748 of the spacer, disregarding any taper, may have a minimum thickness of 0.0003 inches.

For the purposes of the instant description, the outer surface 742 may be further categorized as 742A, 742B, or 742C, depending on where along the spacer 706 the outer surface 742 is geographically. To elaborate: 742A designates the outer surface 742 at the main portion 754; 742B designates the outer surface 742 at the transition portion 764; and 742C designates the outer surface 742 at the lip portion 762. A reference to the outer surface 742 without the use of a letter is meant to indicate the outer surface 742 in total, or any portion thereof, without regard to geographic location along the spacer 706.

Likewise, for the purposes of the instant description, the inner surface 744 may be further categorized as 744A, 744B, or 744C, depending on where along the spacer 706 the inner surface 744 is geographically. To elaborate: 744A designates the inner surface 744 at main portion 754; 744B designates the inner surface 744 at the transition portion 764; and 744C designates the inner surface 744 at the lip portion 762. A reference to the inner surface 744 without the use of a letter is meant to indicate the inner surface 744 in total, or any portion thereof, without regard to geographic location along the spacer 706.

The spacer 706 may be formed from a polymeric material, or from any other material, such as plastic, metal, paper, cardboard, wood, paint, or fabric. The spacer 706 may be formed by injection molding. The spacer 706 may be formed from any other process, such as heat shrinking, where, the spacer is loosely disposed on at least a portion of the driveshaft end component 708 and heated, causing the polymeric heat-shrink material to contract around at least a portion of the driveshaft end component 708. Alternatively, the spacer may comprise a pliable substrate wrapped around at least a portion of the driveshaft end component 708. Further, the spacer may comprise a coating applied to at least a portion of the driveshaft end component 708, or as shown in FIG. 11A, the coating may be applied to the inner surface 714A of the receiving end portion 710. The spacer may comprise a UV-cured urethane coating on at least a portion of the driveshaft end component 708 or the inner surface 714A of the receiving end portion 710. Generally, the UV-cured urethane coating would be sprayed onto the desired component of the driveshaft assembly 700 and subsequently cured with UV light.

The driveshaft end component 708 is a rigid body comprising an insert end portion 766 in axial alignment with an attachment end portion 768 (shown in part). The driveshaft end component 708 may be formed by machining a blank, forging, or casting. The driveshaft end component 708 may be formed from a metal such as aluminum or steel. As shown, the driveshaft end component 708 is a unitary body, but it may be formed from a plurality of coupled components.

The insert end portion 766 comprises an end surface 770, an edge 772, a spacer mounting seat 774, a spacer catch surface 776, a shaft mounting seat 778, and a shaft catch surface 780, all in axial alignment with one another.

The edge 772 is formed at the boundary between the end surface 770 and the spacer mounting seat 774. The edge 772 has a radius of curvature $C_2$.

The spacer mounting seat 774 is an annular protrusion from the shaft mounting seat 778. As shown, spacer mounting seat 774 is substantially cylindrical and has a diameter 782 that is constant; however, as suggested in FIGS. 11B and 12, the spacer mounting seat 774 may be tapered. Further, the spacer mounting seat 774 may include features or be sized to facilitate welding the shaft 704 to the driveshaft end component 708.

The spacer catch surface 776 is an annular, planar surface that defines the boundary between the spacer mounting seat 774 and the shaft mounting seat 778. The spacer catch surface 776 preferably lies in a plane substantially transverse to the longitudinal axis 702 of the assembled driveshaft 700. However, the spacer catch surface 776 may also extend between the spacer mounting seat 774 and the shaft mounting seat 778 in ways other than transverse, such as angled or curvilinear.

The shaft mounting seat 778 is an annular protrusion from the attachment end portion 768 of the driveshaft end component 708. As shown, the shaft mounting seat 778 has a constant diameter 784; however, the shaft mounting seat 778 may be tapered. Further, the shaft mounting seat 778 may include features or be sized to facilitate welding the shaft 704 to the driveshaft end component 708.

The shaft catch surface 780 is an annular, planar surface that defines the boundary between the insert end portion 766 and the attachment end portion 768. The shaft catch surface 780 preferably lies in a plane substantially transverse to the longitudinal axis 702 of the assembled driveshaft 700. However, the shaft catch surface 780 may also extend between the shaft mounting seat 778 and the attachment end portion 768 in ways other than transverse, such as angled or curvilinear.

The attachment end portion 768 includes a coupling end (not shown). The coupling end may comprise a yoke for coupling the driveshaft end component 708 to a universal joint, a constant velocity joint, or any other joint. Alternatively, the coupling end may include a plurality of splines formed thereon, gear teeth formed thereon, or the coupling end may include any other fitting.

The outer diameter 740 of the spacer 706 is substantially the same as the receiving end portion inner diameter 720 of the shaft 704, thereby providing for an interference fit between the spacer 706 and the shaft 704 upon assembly of the driveshaft 700. Further, the receiving end portion inner diameter 720 of the shaft 704 is substantially the same as the diameter 784 of the shaft mounting seat 778 of the driveshaft end component 708, thereby by providing for an interference fit between the driveshaft end component 708 and the shaft 704 upon assembly of the driveshaft 700.

The first inner diameter 736 of the spacer 706, equal to a diameter of the second opening 760 encircled by the second terminal surface 752, is less than the diameter 782 of the spacer mounting seat 774.

The second inner diameter 738 of the spacer 706 is substantially the same as the diameter 782 of at least a portion of the spacer mounting seat 774, thereby providing for an interference fit between the spacer 706 and at least a portion of the spacer mounting seat 774.

The transition portion 764 has a radius of curvature, $C_1$, that is substantially the same as the radius of curvature, $C_2$, of the edge 772 formed between the end surface 770 and the spacer mounting seat 774. That is, $C_1 \cong C_2$, thus allowing for substantially continuous contact between the inner surface 744 of the spacer 706 and at least a portion of the spacer mounting seat 774 upon assembly of the driveshaft 700.

The thickness 786 of the spacer mounting seat 774, measured as the distance along the longitudinal axis 702 between the end surface 770 and the spacer catch surface 776, may be substantially the same as a length 788 of the spacer 706, as measured along the longitudinal axis 702 such that the first terminal surface 750 contacts the spacer catch surface 776. However, the length 788 of the spacer 706 may be less than the thickness 786 of the spacer mounting seat 774 such that the first terminal surface 750 does not contact the spacer catch surface 776.

The spacer catch surface 776 may have a radial dimension 789 that is equal to the difference in the diameter 782 of the spacer mounting seat and the diameter 784 of the shaft mounting seat 778. The radial dimension 789 of the spacer catch surface 776 may or may not be equal to a thickness 790 of the wall 748, wherein the thickness 790 is equal to the difference between the second inner diameter 738 and the outer diameter 740.

Upon assembly, the spacer 706 sits on at least a portion of the spacer mounting seat 774 such that at least a first portion of the end surface 770 is visible through the second opening 760 and at least a second portion of the end surface 770 is in contact with the inner surface 744C. The inner surface 744A contacts at least a portion of the spacer mounting seat 774 and inner surface 744B contacts edge 772.

The second terminal surface 752 is not in contact with the spacer mounting seat 774. As noted above, the first terminal surface 750 may or may not be in contact with the spacer catch surface 776. If present, any tapered portion (not shown) would form a smooth, stepless transition from the outer surface 742 of the spacer 706 to the insert end portion 766.

The terminus 722 of the wall 724 of the shaft 704 contacts the shaft catch surface 780. Further, the shaft 704 may sit on the insert end portion 766 such that the shaft mounting seat 778 is disposed within the hollow interior 716, forming an interference fit between the shaft mounting seat 778 and the inner surface 714 of the shaft 704. Preferably, the shaft mounting seat 778 contacts the inner surface 714 at the receiving end portion 710, designated as 714A. Alternatively, the diameter 784 of the shaft mounting seat 778 may be less than the receiving end portion inner diameter 720 such that no interference fit is formed between the shaft mounting seat 778 and the shaft 704.

At least a portion of the outer surface 742 of the spacer 706 contacts the inner surface 714 of the shaft 704, forming an interference fit between the spacer 706 and the inner surface 714 of the shaft 704. Preferably, the portion of the outer surface 742 of the spacer 706 that contacts the inner surface 714 of the shaft 704 is the outer surface 742A at the main portion 754 of the spacer 706. Also preferably, spacer 706 contacts the inner surface 714 at the receiving end portion 710, designated as 714A.

When the driveshaft assembly 700 is completed, the first receiving end portion 710 is coupled to the driveshaft end component 708 at the first receiving end portion 710 by a weld. The first receiving end portion 710 may be coupled to the driveshaft end component 708 by a magnetic pulse weld, a butt weld formed therebetween, an arc seam weld formed through the shaft 704, or by any other method of welding. Alternately, a plurality of fasteners (not shown) may be used to couple the first receiving end portion 710 to the driveshaft end component 708. When the plurality of fasteners is used to couple the first receiving end portion 710 to the driveshaft end component 708, the first receiving end portion 710 may include a mounting flange (not shown) for receiving the plurality of fasteners.

Figure 10:
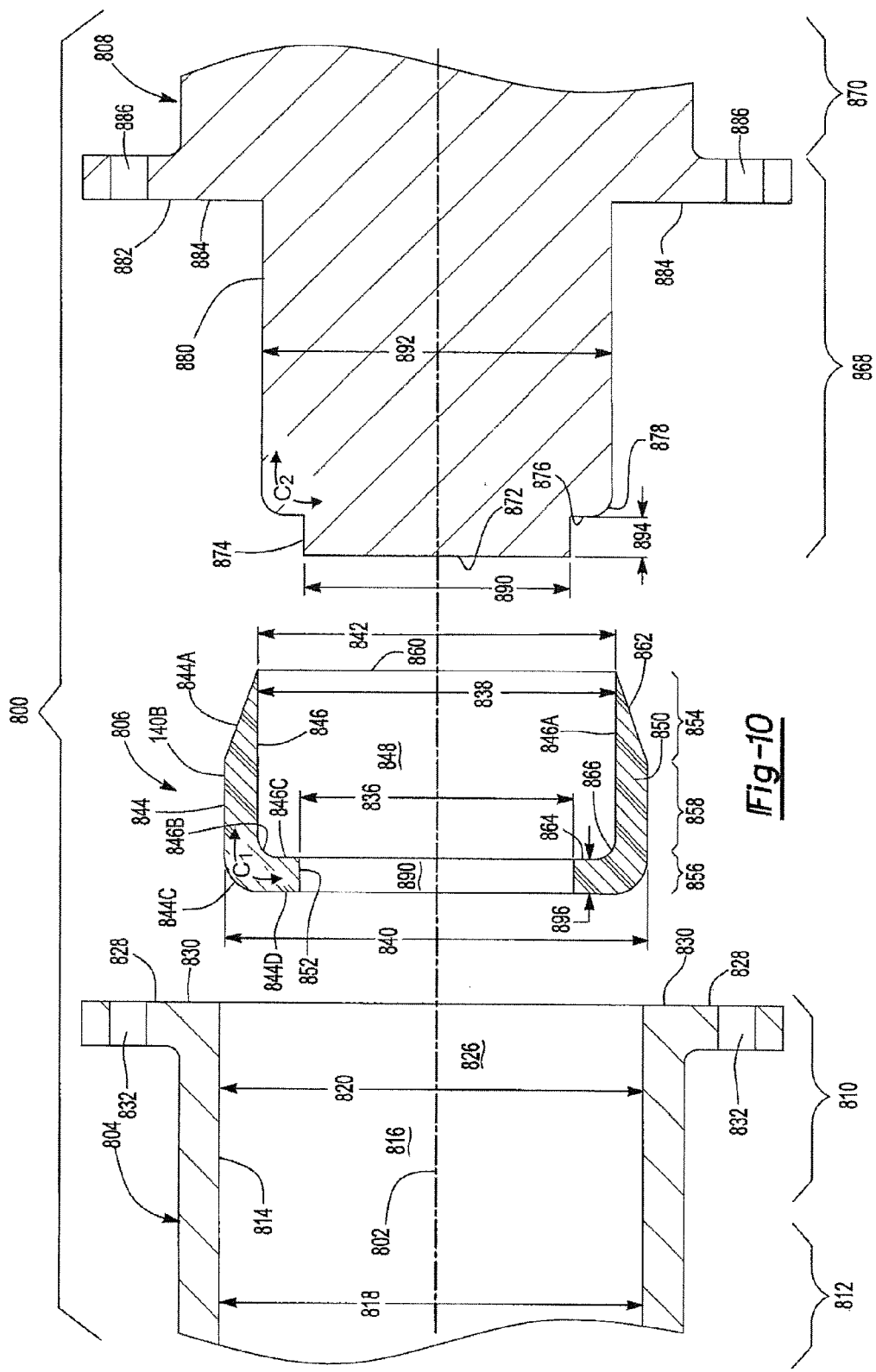
FIG. 10 is a partial, cross-sectional view of an embodiment of an exploded driveshaft assembly including a spacer according to yet another embodiment of the present invention.

FIG. 10 illustrates a driveshaft assembly according to an embodiment of the present invention. While the figures depict a driveshaft assembly, it can be readily appreciated that the invention can be applied to other assemblies where two or more parts are rigidly joined together. The driveshaft assembly is merely one exemplary embodiment.

The driveshaft assembly 800 is assembled along a longitudinal axis 802. The driveshaft assembly 800 includes a shaft 804, an annular spacer 806, and a driveshaft end component 808. As shown, the spacer 806 is disposed between a first receiving end portion 810 of the shaft 804 and a first driveshaft end component 808, but it is understood the spacer 806 may be disposed between a second receiving end portion (not shown) of the shaft 804 and a second driveshaft end component (not shown).

The shaft 804 is a tubular, elongate body comprising the first receiving end portion 810, the second receiving end portion (not shown), and a center shaft portion 812 (shown in part), wherein the center shaft portion 812 is bounded by the first 810 and second (not shown) receiving end portions. As shown in FIG. 10, the shaft 804 may be hollow, with an inner surface 814 and a hollow interior 816 extending along and through the shaft 804. The center shaft portion 812 of shaft 804 may have a center shaft portion inner diameter 818 that is substantially the same as a receiving end portion inner diameter 820 of either or both of the first 810 or second (not shown) receiving end portions. Alternatively, the center portion 812 of shaft 804 may have a center shaft portion inner diameter 818 that differs from a receiving end portion inner diameter 820 of either or both of the first 810 or second (not shown) receiving end portions.

The first receiving end portion 810 comprises at least (i) an opening 826 to hollow interior 816 and a shaft flange 828. The shaft flange 828 comprises a shaft flange end surface 830 and a plurality of shaft fastener apertures 832. The shaft flange 828 may be formed integrally with the shaft 804.

The shaft 804 may be formed by extrusion, but other processes such as roll forming, tube milling, or machining may be used. The shaft 804 may be formed from aluminum, a steel, or any other metal. The shaft 804 may also be a composite shaft. A composite shaft is comprised of, for example, a non-metallic center portion, a metallic first distal end portion, and a metallic second distal end portion. The non-metallic center portion may be formed from carbon fiber.

The annular spacer 806 is a hollow, generally tubular shaped body, with a first inner diameter 836, a second inner diameter 838, and a first outer diameter 840 and second outer diameter 842, wherein the second outer diameter 842 may be substantially the same as the second inner diameter 838. The spacer 806 also comprises an outer surface 844, an inner surface 846, an interior 848, a wall 850 interposed between the outer 844 and inner 846 surfaces, and a terminal surface 852. The spacer 806 also comprises a first end portion 854, a second end portion 856, and a center portion 858, wherein the center portion 858 is bounded by the first 854 and second 856 end portions.

A first opening 860 is disposed within the first end portion 854. The first end portion 854 may further comprise a tapered portion 862. The second end portion 856 comprises a lip portion 864 and a transition portion 866. The second end portion 856 is formed with the wall 850 of the spacer 806 bent in an arcuate fashion toward the interior 848 of the spacer 806. This arcuate bend in the wall 850 forms the transition portion 866 and has a radius of curvature, $C_1$. The portion of the wall 850 that points to the interior 848 of the spacer 806 forms the lip portion 864. The lip portion 864 is unitary with the spacer 806 and may be substantially at a right angle to the center portion 858 of the spacer 806. The wall 850 of the spacer 806 may increase in thickness along the longitudinal axis 802 in the direction from the first opening 860 of the spacer 806 towards the center portion 858 of the spacer 806, thus forming the tapered portion 862. The wall 850 of the spacer, disregarding the tapered portion 862, may have a minimum thickness of 0.0003 inches.

For the purposes of the instant description, the outer surface 844 may be further categorized as 844A, 844B, 844C, or 844D, depending on where along the spacer 806 the outer surface 844 is geographically. To elaborate: 844A designates the outer surface 844 at the tapered portion 862; 844B designates the outer surface 844 at the center portion 858; 844C designates the outer surface 844 at the transition portion 866; and 844D designates the outer surface 844 at the lip portion 864. A reference to the outer surface 844 without the use of a letter is meant to indicate the outer surface 844 in total, or any portion thereof, without regard to geographic location along the spacer 806.

Likewise, for the purposes of the instant description, the inner surface 846 may be further categorized as 846A, 846B, or 846C, depending on where along the spacer 806 the inner surface 846 is geographically. To elaborate: 846A designates the inner surface 846 at the tapered 862 and center 858 portions; 846B designates the inner surface 846 at the transition portion 866; and 846C designates the inner surface 846 at the lip portion 864. A reference to the inner surface 846 without the use of a letter is meant to indicate the inner surface 846 in total, or any portion thereof, without regard to geographic location along the spacer 806.

The spacer 806 may be formed from a polymeric material, or from any other material, such as plastic, metal, paper, cardboard, wood, paint, or fabric. The spacer 806 may be formed by injection molding. The spacer 806 may be formed from any other process, such as heat shrinking, where, the spacer is loosely disposed on at least a portion of the driveshaft end component 808 and heated, causing the polymeric heat-shrink material to contract around at least a portion of the driveshaft end component 808. Alternatively, the spacer may comprise a pliable substrate wrapped around at least a portion of the driveshaft end component 808. Further, the spacer may comprise a coating applied to at least a portion of the driveshaft end component 808, or as shown in FIG. 11A, the coating may be applied to the inner surface 814 of the receiving end portion 810. The spacer may comprise a UV-cured urethane coating on at least a portion of the driveshaft end component 808 or the inner surface 814 of the receiving end portion 810. Generally, the UV-cured urethane coating would be sprayed onto the desired component of the driveshaft assembly 800 and subsequently cured with UV light.

The driveshaft end component 808 is a rigid body comprising an insert end portion 868 in axial alignment with an attachment end portion 870 (shown in part). The driveshaft end component 808 may be formed by machining a blank, forging, or casting. The driveshaft end component 808 may be formed from a metal such as aluminum or steel. As shown, the driveshaft end component 808 is a unitary body, but it may be formed from a plurality of coupled components.

The insert end portion 868 comprises an end surface 872, a spacer mounting seat 874, a spacer catch surface 876, an edge 878, a main insert portion 880, and a mounting flange 882, all in axial alignment with one another.

The spacer mounting seat 874 is an annular protrusion from the main insert portion 880.

The spacer catch surface 876 is an annular, generally planar surface that defines the boundary between the spacer mounting seat 874 and the main insert portion 880. The spacer catch surface 876 preferably lies in a plane substantially transverse to the longitudinal axis 802 of the assembled driveshaft 800. However, the spacer catch surface 876 may also extend between the spacer mounting seat 874 and the main insert portion 880 in ways other than transverse, such as angled or curvilinear.

The main insert portion 880 is an annular protrusion from the mounting flange 882. As shown, the main insert portion 880 is substantially cylindrical and has a diameter 892 that is constant; however, as suggested in FIGS. 11B and 12, the main insert portion 880 may be tapered. Further, the main insert portion 880 may include features or be sized to facilitate welding the shaft 804 to the driveshaft end component 808.

The edge 878 is formed at the boundary between the spacer catch surface 876 and the main insert portion 880. The edge 878 has a radius of curvature $C_2$.

The mounting flange 882 comprises a mounting flange surface 884 and a plurality of mounting flange fastener apertures 886. The mounting flange 882 is formed integrally with the driveshaft end component.

The attachment end portion 870 includes a coupling end (not shown). The coupling end may comprise a yoke for coupling the driveshaft end component 808 to a universal joint, a constant velocity joint, or any other joint. Alternatively, the coupling end may include a plurality of splines formed thereon, gear teeth formed thereon, or the coupling end may include any other fitting.

The first outer diameter 840 of the spacer 806 is substantially the same as the receiving end portion inner diameter 820 of the shaft 804, thereby providing for an interference fit between the spacer 806 and the shaft 804 upon assembly of the driveshaft 800.

The first inner diameter 836 of the spacer 806, equal to a diameter of a second opening 888 to the interior 848 encircled by the terminal surface 852, is substantially the same as the diameter 890 of the spacer mounting seat 874, thereby providing for an interference fit between the spacer 806 and the spacer mounting seat 874.

The second inner diameter 838 of the spacer 806 is substantially the same as the diameter 892 of at least a portion of the main insert portion 880, thereby providing for an interference fit between the spacer 806 and at least a portion of the main insert portion 880.

The thickness 894 of the spacer mounting seat 874, measured as the distance along the longitudinal axis 802 between the end surface 872 and the spacer catch surface 876, may be substantially the same as a length 896 of the terminal surface 852, as measured along the longitudinal axis 802. However, the thickness 894 of the spacer mounting seat 874 may be such that the end surface 872 may be recessed from, or protrude from, the second opening 888 of spacer 806.

The spacer catch surface 876 may have a radial dimension equal to the difference between the diameter 892 of the main insert portion 880 and the diameter 890 of the spacer mounting seat 874.

The transition portion 866 has a radius of curvature, $C_1$, that is substantially the same as the radius of curvature, $C_2$, of the edge 878 formed between the spacer catch surface 876 and the main insert portion 880. That is, $C_1 \cong C_2$, thus allowing for substantially continuous contact between the inner surface 846 of the spacer 806 and at least a portion of the insert end portion 868 upon assembly of the driveshaft 800.

Upon assembly, the spacer 806 sits on at least a portion of the insert end portion 868 such that the end surface 872 and spacer mounting seat 874 are disposed within the second opening 888. The inner surface 846C contacts the spacer catch surface 876 and the inner surface 846A contacts at least a portion of the main insert portion 880. Inner surface 846B contacts edge 878.

The terminal surface 852 contacts the spacer mounting seat 874, but end surface 872 would be visible through the second opening 888 and is not in contact with the spacer 806. The end surface 872 may be flush with the outer surface 844 of the spacer 806 or the end surface 872 may be recessed therefrom or protrude therefrom. If present, the tapered portion 862 may form a smooth, stepless transition from the outer surface 844 of the spacer 806 to the main insert portion 880.

At least a portion of the outer surface 844 of the spacer 806 contacts the inner surface 814 of the shaft 804, forming an interference fit between the spacer 806 and the inner surface 814 of the shaft 804. Preferably, the portion of the outer surface 844 of the spacer 806 that contacts the inner surface 814 of the shaft 804 is the outer surface 844B at the center portion 858 of the spacer 806.

When the driveshaft assembly 800 is completed, a plurality of fasteners (not shown) may be used to couple the first receiving end portion 810 to the driveshaft end component 808. When the plurality of fasteners is used to couple the first receiving end portion 810 to the driveshaft end component 808, the shaft flange end surface 830 and the mounting flange surface 884 will be in contact and the plurality of shaft fastener apertures 832 and the plurality of mounting flange fastener apertures 886 will be aligned, thereby able to receive the plurality of fasteners (not shown).

Alternatively, the first receiving end portion 810 may be coupled to the driveshaft end component 808 at the first receiving end portion 810 by a weld. The first receiving end portion 810 may be coupled to the driveshaft end component 808 by a magnetic pulse weld, a butt weld formed therebetween, an arc seam weld formed through the shaft 804, or by any other method of welding.

FIG. 11A illustrates a shaft, with a annular spacer disposed therein, according to an embodiment of the present invention. While the figure depicts components of a driveshaft assembly, it can be readily appreciated that the invention can be applied to other assemblies where two or more parts are rigidly joined together. The driveshaft assembly is merely one exemplary embodiment.

The driveshaft assembly (shown in part) is assembled along a longitudinal axis 902. The driveshaft assembly (shown in part) includes a shaft 904, an annular spacer 906, and a driveshaft end component (not shown). As shown, the spacer 906 is disposed within the shaft 904. The details of the individual features of the shaft, or its construction or formation can be that of any of the previously described embodiments. The distinguishing feature is that, here, the spacer 906 is formed within the shaft 904. Preferably, the spacer 906 is a coating applied to the inner surface 914 of the shaft. Also preferably, the spacer 906 is composed of a UV-cured urethane.

FIG. 11B illustrates a driveshaft end component, with a annular spacer disposed thereon, according to an embodiment of the present invention. While the figure depicts components of a driveshaft assembly, it can be readily appreciated that the invention can be applied to other assemblies where two or more parts are rigidly joined together. The driveshaft assembly is merely one exemplary embodiment.

The driveshaft assembly (shown in part) is assembled along a longitudinal axis 902. The driveshaft assembly (shown in part) includes a shaft (not shown), an annular spacer 906, and a driveshaft end component 908. As shown, the spacer 906 is disposed on the driveshaft end component 908. The details of the individual features of the driveshaft end component 908, or its construction or formation, can be that of any of the previously described embodiments. Preferably the main insert portion 966 is tapered.

The details of the individual features of the spacer 906, or its construction or formation, can be that of any of the previously described embodiments. Preferably, the spacer 906 is a coating applied to at least a portion of the driveshaft end component. Also preferably the spacer is 906 composed of a UV-cured urethane.

Figure 12:
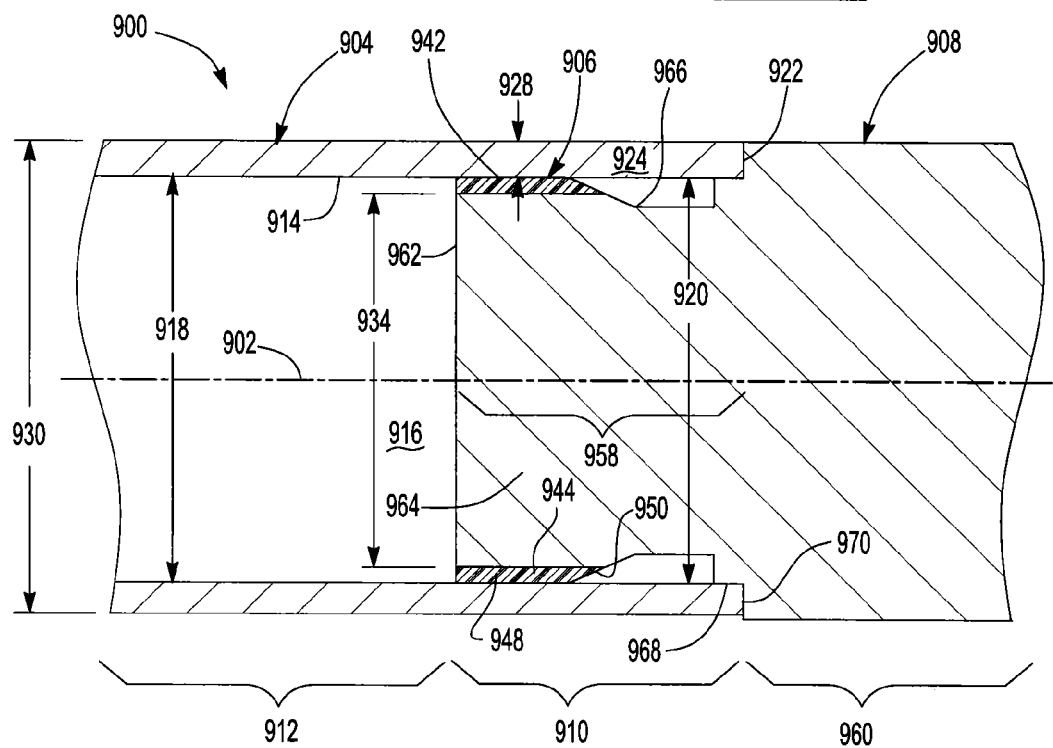
FIG. 12 is a partial, cross-sectional view of an embodiment of an assembled driveshaft assembly including a spacer according to yet another embodiment of the present invention.

FIG. 12 illustrates a driveshaft assembly according to an embodiment of the present invention. While the figure depicts components of a driveshaft assembly, it can be readily appreciated that the invention can be applied to other assemblies where two or more parts are rigidly joined together. The driveshaft assembly is merely one exemplary embodiment.

The driveshaft assembly 900 is assembled along a longitudinal axis 902. The driveshaft assembly 900 includes a shaft 904, an annular spacer 906, and a driveshaft end component 908. As shown, the spacer 906 is disposed between a first receiving end portion 910 of the shaft 904 and a first driveshaft end component 908, but it is understood the spacer 906 may be disposed between a second receiving end portion (not shown) of the shaft 904 and a second driveshaft end component (not shown).

The shaft 904 is a tubular, elongate body comprising the first receiving end portion 910, the second receiving end portion (not shown), and a center shaft portion 912 (shown in part), wherein the center shaft portion 912 is bounded by the first 910 and second (not shown) receiving end portions. As shown in FIG. 12, the shaft 904 may be hollow, with an inner surface 914 and a hollow interior 916 extending along and through the shaft 904. The center shaft portion 912 of shaft 904 may have a center shaft portion inner diameter 918 that is substantially the same as a receiving end portion inner diameter 920 of either or both of the first 910 or second (not shown) receiving end portions. Alternatively, the center portion 912 of shaft 904 may have a center shaft portion inner diameter 918 that differs from a receiving end portion inner diameter 920 of either or both of the first 910 or second (not shown) receiving end portions. The first 910 or second (not shown) receiving end portions may be formed by machining the shaft 904 in a secondary operation, but may also be formed by any other method.

The first receiving end portion 910 comprises at least (i) a terminus 922 of wall 924, wherein the terminus 922 has a thickness 928 defined by the difference between the receiving end portion inner diameter 920 and the receiving end portion outer diameter 930, (ii) an opening (not shown) to hollow interior 916.

The shaft 904 may be formed by extrusion, but other processes such as roll forming, tube milling, or machining may be used. The shaft 904 may be formed from aluminum, a steel, or any other metal. The shaft 904 may also be a composite shaft. A composite shaft is comprised of, for example, a non-metallic center portion, a metallic first distal end portion, and a metallic second distal end portion. The non-metallic center portion may be formed from carbon fiber.

The annular spacer 906 is a hollow, generally tubular shaped body, with an inner diameter 934, an outer diameter that is substantially equal to diameter 920, an outer surface 942, an inner surface 944, an interior (not shown), and a wall 948 interposed between the outer 942 and inner 944 surfaces. The wall 948 of spacer 906 may have a taper 950. The wall 948 of the spacer, disregarding any tapered portion, may have a minimum thickness of 0.0003 inches.

The spacer 906 may be formed from a polymeric material, or from any other material, such as plastic, metal, paper, cardboard, wood, paint, or fabric. The spacer 606 may be formed by injection molding. The spacer 906 may be formed from any other process, such as heat shrinking, where, the spacer is loosely disposed on at least a portion of the driveshaft end component 908 and heated, causing the polymeric heat-shrink material to contract around at least a portion of the driveshaft end component 908. Alternatively, the spacer may comprise a pliable substrate wrapped around at least a portion of the driveshaft end component 908. As shown in FIG. 11B, the spacer may comprise a coating applied to at least a portion of the driveshaft end component 908, or as shown in FIG. 11A, the coating may be applied to the inner surface 914 of the receiving end portion 910. The spacer may comprise a UV-cured urethane coating on at least a portion of the driveshaft end component 908 or the inner surface 914 of the receiving end portion 910. Generally, the UV-cured urethane coating would be sprayed onto the desired component of the driveshaft assembly 900 and subsequently cured with UV light.

The driveshaft end component 908 is a rigid body comprising an insert end portion 958 in axial alignment with an attachment end portion 960 (shown in part). The driveshaft end component 908 may be formed by machining a blank, forging, or casting. The driveshaft end component 908 may be formed from a metal such as aluminum or steel. As shown, the driveshaft end component 908 is a unitary body, but it may be formed from a plurality of coupled components.

The insert end portion 958 comprises an end surface 962, a spacer mounting seat 964, a main insert portion 966, a shaft mounting seat 968, and a shaft catch surface 970, all in axial alignment with one another.

The spacer mounting seat 964 is an annular protrusion from the main insert portion 966. As shown, the spacer mounting seat 964 is substantially cylindrical and has a substantially constant diameter substantially equal to the diameter 934. Further, the spacer mounting seat 964 may include features or be sized to facilitate welding the shaft 904 to the driveshaft end component 908.

The main insert portion 966 is an annular protrusion from the shaft mounting seat 968. As shown, the main insert portion 966 is tapered. The main insert portion 966 may also include additional features or be sized to facilitate welding the shaft 904 to the driveshaft end component 908.

The shaft mounting seat 968 is an annular protrusion from the attachment end portion 960 of the driveshaft end component 908. Further, the shaft mounting seat 968 may be substantially cylindrical, or may be tapered or include features or be sized to facilitate welding the shaft 904 to the driveshaft end component 908.

The shaft catch surface 970 is an annular, planar surface that defines the boundary between the insert end portion 958 and the attachment end portion 960. The shaft catch surface 970 preferably lies in a plane substantially transverse to the longitudinal axis 902 of the assembled driveshaft 900. However, the shaft catch surface 970 may also extend between the shaft mounting seat 968 and the attachment end portion 960 in ways other than transverse, such as angled or curvilinear.

The attachment end portion 960 includes a coupling end (not shown). The coupling end may comprise a yoke for coupling the driveshaft end component 908 to a universal joint, a constant velocity joint, or any other joint. Alternatively, the coupling end may include a plurality of splines formed thereon, gear teeth formed thereon, or the coupling end may include any other fitting.

An outer diameter of the spacer 906 is substantially the same as the receiving end portion inner diameter 920 of the shaft 904, thereby providing for an interference fit between the spacer 906 and the shaft 904 upon assembly of the driveshaft 900.

The inner diameter 938 of the spacer 906 is substantially the same as the diameter of at least a portion of the spacer mounting seat 964.

Upon assembly, the spacer 906 sits on at least a portion of the insert end portion 958 such that at least a portion of the spacer mounting seat 964 is disposed within the spacer 906 and the inner surface 944 contacts at least a portion of the spacer mounting seat 964.

At least a portion of the outer surface 942 of the spacer 906 contacts the inner surface 914 of the shaft 904, forming an interference fit between the spacer 906 and the inner surface 914 of the shaft 904.

When the driveshaft assembly 900 is completed, the first receiving end portion 910 is coupled to the driveshaft end component 908 at the first receiving end portion 910 by a weld. The first receiving end portion 910 may be coupled to the driveshaft end component 908 by a magnetic pulse weld, a butt weld formed therebetween, an arc seam weld formed through the shaft 904, or by any other method of welding. Alternately, a plurality of fasteners (not shown) may be used to couple the first receiving end portion 910 to the driveshaft end component 908. When the plurality of fasteners is used to couple the first receiving end portion 910 to the driveshaft end component 908, the first receiving end portion 910 may include a mounting flange (not shown) for receiving the plurality of fasteners.

The advantages of the present invention will be obvious to those skilled in the art. Such advantages include reduced fretting between rigidly coupled driveshaft components. The spacer of the present invention will also reduce or eliminate tinking. Further, either or both of these results are achieved with a minimal increase in expense or steps for assembly.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A driveshaft assembly comprising:
    (a) a tubular shaft comprising:
        (i) at least a first receiving end portion with an opening disposed therein, wherein the receiving end portion has a receiving end portion inner diameter,
        (ii) a center portion, wherein the center portion has a center portion inner diameter, and
        (iii) a hollow interior with a shaft inner surface,
    (b) a driveshaft end component comprising an insert end portion and an attachment end portion; and
    (c) an annular anti-fretting spacer composed of a UV-cured urethane comprising:
        (i) a first outer diameter, wherein the first outer diameter of the spacer is substantially equal to the receiving end portion inner diameter,
        (ii) a second outer diameter, and
        (iii) an outer surface, wherein at least a portion of the outer surface is in contact with the shaft inner surface,
    wherein the spacer is disposed on the insert end portion of the driveshaft end component, wherein the insert end portion of the driveshaft end component, including the spacer, is disposed within the receiving end portion of the shaft, and wherein the shaft is rigidly coupled to the driveshaft end component.

2. The driveshaft assembly of claim 1, wherein the tubular shaft further comprises:
    (a) the at least first receiving end portion further comprising a receiving end portion outer diameter, and
    (b) at least a first terminus with a thickness equal to the difference between the receiving end portion inner and outer diameters; and
wherein the annular anti-fretting spacer further comprises:
    (a) a first inner diameter,
    (b) a second inner diameter,
    (c) an inner surface,
    (d) a wall disposed between the inner and outer surfaces,
    (e) a spacer interior,
    (f) a first opening to the interior, and
    (g) a second opening to the interior.

3. The driveshaft assembly of claim 2, wherein the center portion inner diameter is less than the receiving end portion inner diameter, and wherein the tubular shaft further comprises a second terminus, having a thickness equal to the difference between the center portion inner diameter and the receiving end portion inner diameter.

4. The driveshaft assembly of claim 2, wherein the tubular shaft further comprises a shaft flange extending radially from the first terminus away from the shaft interior, and wherein the shaft flange comprises a plurality of fastener apertures disposed therein and a shaft flange surface.

5. The driveshaft assembly of claim 2, wherein the insert end portion further comprises a main insert portion and an end surface.

6. The driveshaft assembly of claim 5, wherein the insert end portion further comprises an end edge between the end surface and the main insert portion.

7. The driveshaft assembly of claim 6, wherein the insert end portion further comprises a catch surface.

8. The driveshaft assembly of claim 5, wherein the insert end portion further comprises a mounting flange, wherein the mounting flange extends radially from the main insert portion and wherein the mounting flange further comprises (i) a plurality of fastener apertures disposed therein and (ii) a mounting flange surface.

9. The driveshaft assembly of claim 5, wherein the insert end portion further comprises a shaft mounting seat and a shaft catch surface.

10. The driveshaft assembly of claim 9, wherein the insert end portion further comprises an insert bevel between the shaft mounting seat and the main insert portion.

11. The driveshaft assembly of claim 10, wherein the insert end portion further comprises a spacer mounting seat, a spacer catch surface and an edge with a radius of curvature $C_2$ disposed between the spacer catch surface and the main insert portion.

12. The driveshaft assembly of claim 2, wherein the first inner diameter of the spacer is substantially equal to the second inner diameter of the spacer, and wherein the first outer diameter of the spacer is substantially equal to the second outer diameter of the spacer.

13. The driveshaft assembly of claim 2, wherein the first inner diameter of the spacer differs from the second inner diameter of the spacer.

14. The driveshaft assembly of claim 13, wherein the first outer diameter is substantially equal to the second outer diameter.

15. The driveshaft assembly of claim 13, wherein the first outer diameter differs from the second outer diameter, and wherein the second outer spacer diameter is substantially equal to the second inner diameter.

16. The driveshaft assembly of claim 13, wherein the spacer further comprises a main portion and an end portion, wherein the end portion further comprises a lip portion and a transition portion, wherein the transition portion has a radius of curvature, $C_1$.

17. The driveshaft assembly of claim 13, wherein the spacer further comprises a first end portion, a second end portion, and a center portion, wherein the first end portion further comprises a tapered portion, wherein the second end portion further comprises a lip portion and a transition portion, and wherein the transition portion has a radius of curvature, $C_1$.

18. The driveshaft assembly of claim 2, wherein the wall of the spacer has a minimum thickness of at least 0.0003 inches, disregarding any tapered portions.

19. The driveshaft assembly of claim 1, wherein the center portion inner diameter is substantially equal to the receiving end portion inner diameter.

20. The driveshaft assembly of claim 1, wherein the driveshaft end component is a unitary body.

21. The driveshaft assembly of claim 1, wherein the spacer is formed from a polymeric material by injection molding.

22. The driveshaft assembly of claim 1, wherein the tubular shaft, annular spacer and driveshaft end component share a common longitudinal axis.

23. The driveshaft assembly of claim 1, wherein the insert end portion of the driveshaft end component comprises a main insert portion, and wherein the main insert portion is tapered.

24. A driveshaft assembly comprising:
   (a) a tubular shaft comprising:
      (i) at least a first receiving end portion with an opening disposed therein, wherein the receiving end portion has a receiving end portion inner diameter,
      (ii) a center portion, wherein the center portion has a center portion inner diameter, and
      (iii) a hollow interior with a shaft inner surface,
   (b) a driveshaft end component comprising an insert end portion and an attachment end portion; and
   (c) an annular anti-fretting spacer composed of a UV-cured urethane comprising:
      (i) a first outer diameter, wherein the first outer diameter of the spacer is substantially equal to the receiving end portion inner diameter, and
      (ii) an outer surface, wherein at least a portion of the outer surface is in contact with the shaft inner surface,
   wherein the spacer is disposed in the receiving end portion of the shaft, wherein the insert end portion of the driveshaft end component is disposed within the spacer with an interference fit, and wherein the shaft is rigidly coupled to the driveshaft end component.

25. The driveshaft assembly of claim 24, wherein the insert end portion of the driveshaft end component comprises a main insert portion, and wherein the main insert portion is tapered.

* * * * *